(12) United States Patent
Marshall, II et al.

(10) Patent No.: US 12,702,947 B2
(45) Date of Patent: Aug. 11, 2026

(54) MULTI-STAGE DIRECT CAPTURE OF $CO_2$ FROM AIR

(71) Applicant: EXXONMOBIL TECHNOLOGY AND ENGINEERING COMPANY, Annandale, NJ (US)

(72) Inventors: Bennett D. Marshall, II, Bethlehem, PA (US); Simon C. Weston, Annandale, NJ (US); Aaron W. Peters, New Hope, PA (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 301 days.

(21) Appl. No.: 18/504,380

(22) Filed: Nov. 8, 2023

(65) Prior Publication Data

US 2024/0157283 A1 May 16, 2024

Related U.S. Application Data

(60) Provisional application No. 63/383,697, filed on Nov. 14, 2022.

(51) Int. Cl.
*B01D 53/06* (2006.01)

(52) U.S. Cl.
CPC .......... *B01D 53/06* (2013.01); *B01D 2256/10* (2013.01); *B01D 2257/504* (2013.01); *B01D 2259/4009* (2013.01); *B01D 2259/404* (2013.01)

(58) Field of Classification Search
CPC .... B01D 53/0407; B01D 53/62; B01D 53/04; B01D 53/047; B01D 53/86; B01D 53/06
See application file for complete search history.

(56) References Cited

U.S. PATENT DOCUMENTS 8,974,576 B2 3/2015 Gupta et al.
9,067,168 B2 6/2015 Frederick et al.
(Continued)

FOREIGN PATENT DOCUMENTS

JP 2005-103378 A 4/2005
WO 2017/053062 A1 3/2017

OTHER PUBLICATIONS

Sinha et al., "System design and economic analysis of direct air capture of CO2 through temperature vacuum swing adsorption using MIL-101(CR)-PEI-800 and mmen-Mg2(dobpdc) MOF adsorbents", Ind. Eng. Chem. Res. 2017, vol. 56, pp. 750-764.
(Continued)

*Primary Examiner* — Sharon Pregler
(74) *Attorney, Agent, or Firm* — Shook, Hardy & Bacon L.L.P.

(57) ABSTRACT

Systems and methods are provided for using a multi-stage capture process for capture of $CO_2$ from air. A first or initial sorption process is used to sorb $CO_2$ from air. After sorption from the air is complete, the desorption step of the initial stage is used to form a secondary $CO_2$-containing stream that is passed into one or more additional sorption stages. This secondary $CO_2$-containing stream can be at a concentration of roughly 1.0 vol % or more. Sorption of $CO_2$ from the secondary $CO_2$-containing stream is performed using a different contacting method, such as a contacting method that is higher efficiency. The second or later $CO_2$ sorption stage can produce a $CO_2$-containing output stream with a $CO_2$ concentration of 80 vol % or more, or 90 vol % or more, or 95 vol % or more. This high purity output stream can then be sequestered and/or used for further processing.

16 Claims, 8 Drawing Sheets

(56) References Cited

U.S. PATENT DOCUMENTS

| | | | | |
|---|---|---|---|---|
| 9,352,269 | B2 | 5/2016 | Tammera et al. | |
| 10,322,365 | B2 | 6/2019 | Fowler et al. | |
| 2009/0320679 | A1 | 12/2009 | Baksh | |
| 2014/0175336 | A1 * | 6/2014 | Gupta | C07C 7/12 585/824 |
| 2017/0113184 | A1 | 4/2017 | Eisenberger | |

OTHER PUBLICATIONS

International Search Report and Written Opinion received for PCT Patent Application No. PCT/US2023/079045, mailed on Mar. 22, 2024, 13 pages.

Office Action received for Canadian Patent Application No. 3273059, mailed on Apr. 29, 2026, 5 pages.

* cited by examiner

MULTI-STAGE DIRECT CAPTURE OF $CO_2$ FROM AIR

CROSS-REFERENCE TO RELATED APPLICATIONS AND PRIORITY CLAIM

This Non-Provisional Patent application claims priority to U.S. Provisional Patent Application No. 63/383,697, filed Nov. 14, 2022, and titled "Multi-Stage Direct Capture of $CO_2$ From Air", the entire contents of which is incorporated herein by reference.

FIELD

Systems and methods are provided for a multi-stage sorption process for capture of $CO_2$ from air.

BACKGROUND

Capture and sequestration of $CO_2$ can contribute to efforts for reducing or minimizing the amount of $CO_2$ introduced into the atmosphere by various commercial, residential, and/or industrial processes. One option is to attempt to capture $CO_2$ as it is generated at various types of point sources. Another option is to attempt to remove $CO_2$ directly from air.

Some of the difficulties with direct air capture are related to the relatively low concentration of $CO_2$ in the atmosphere. Typical $CO_2$ concentrations in air are on the order of 400 volume parts per million (vppm). Due to the dilute $CO_2$ concentration, strong chemical adsorbents are required such as amines, potassium hydroxide, or amine appended metal organic frameworks. The strong chemical adsorbents have high heats of reaction with $CO_2$. As a result, the desorption steps of these processes are highly energy intensive. Efforts to minimize the energy usage of the process through heat integration necessarily add complexity and increase capital cost even further. It would be beneficial to have improved systems and methods for capturing $CO_2$ from air that can reduce or minimize the associated capital costs and/or energy requirements.

U.S. Patent Application Publication 2017/0113184 describes single stage methods for removing $CO_2$ from air. The methods include forming a recycle stream corresponding to a portion of the $CO_2$-containing effluent from the removal process and mixing the recycle stream with the air input flow to the process. The $CO_2$-enriched air flow is the exposed to a sorbent. Mixing a recycle stream with the ambient air increases the concentration of $CO_2$ in the input flow, but does not reduce the volume of gas that requires processing in the removal stage.

A journal article by Sinha et al ("System design and economic analysis of direct air capture of $CO_2$ through temperature vacuum swing adsorption using MIL-101(CR)-PEI-800 and mmen-$Mg_2$(dobpdc) MOF adsorbents", Ind. Eng. Chem. Res. 2017, 56, 750-764) describes $CO_2$ adsorption isotherms for some types of MOF adsorbents.

SUMMARY

In various aspects, systems and methods are provided for performing direct air capture using a multi-stage separation system.

In some aspects, a method for separation of $CO_2$ from an input flow stream is provided. The method includes: exposing a first gas flow containing 600 vppm or less of $CO_2$ to at least one first contactor of a plurality of contactors to form a first $CO_2$-depleted gas flow, the at least one first contactor comprising a first sorbent having selectivity for $CO_2$ sorption supported on one or more first monoliths, the exposing the first gas flow further forming a first sorbent comprising sorbed $CO_2$; exposing a second gas flow containing 600 vppm or less of $CO_2$ to at least one second contactor of the plurality of contactors to form a second $CO_2$-depleted gas flow, the at least one second contactor comprising a sorbent having selectivity for $CO_2$ sorption supported on one or more monoliths, the exposing the second gas flow further forming a second sorbent comprising sorbed $CO_2$; exposing the first sorbent comprising sorbed $CO_2$ to a first heated working fluid to form a heated first sorbent and a first $CO_2$-containing working fluid containing 1.0 vol % or more of $CO_2$, the first $CO_2$-containing working fluid formed by desorbing at least a portion of the sorbed $CO_2$ from the first sorbent comprising sorbed $CO_2$; exposing the heated first sorbent to a first nitrogen-enriched gas containing 95 vol % of $N_2$ or more to cool the heated first sorbent and to heat the first nitrogen-enriched gas to form a partially heated working fluid; heating the partially heated working fluid to form a second heated working fluid; exposing the second sorbent comprising sorbed $CO_2$ to at least a portion of the second heated working fluid to form a heated second sorbent and a second $CO_2$-containing working fluid, the second $CO_2$-containing working fluid formed by desorbing at least a portion of the sorbed $CO_2$ from the second sorbent comprising sorbed $CO_2$; exposing the heated second sorbent to a second nitrogen-enriched gas containing 95 vol % or more of $N_2$ to cool the heated second sorbent and to heat the second nitrogen-enriched gas to form a second partially heated working fluid; separating the first CO 2-containing working fluid to form at least a first product flow having a $CO_2$ concentration of 80 vol % or more and a first output flow containing 95 vol % or more of $N_2$; and separating the second $CO_2$-containing working fluid to form at least a second product flow having a $CO_2$ concentration of 80 vol % or more and a second output flow containing 95 vol % or more of $N_2$.

In some aspects, a system for separation of $CO_2$ is provided. The system includes: a plurality of initial stage contactors comprising a sorbent having selectivity for sorption of $CO_2$, each initial stage contactor having a sorption step inlet, a sorption step outlet, at least one additional inlet, and at least one additional outlet, the plurality of initial stage contactors corresponding to at least a first initial stage contactor and a final initial stage contactor; a second separation stage having a second separation stage inlet, a product outlet, and a recycle outlet; an initial stage effluent conduit providing fluid communication between the second separation stage inlet and the at least one additional outlet of the final initial stage contactor, the initial stage effluent conduit containing an effluent flow comprising 95 vol % or more of $N_2$ and 1.0 vol % or more of $CO_2$; a recycle conduit providing fluid communication between the recycle outlet and the at least one additional inlet of the first initial stage contactor, the recycle conduit containing a recycle gas containing 95 vol % or more of $N_2$ and 0.08 vol % to 0.5 vol % of $CO_2$; and a working fluid conduit providing fluid communication between the at least one additional outlet of the first initial stage contactor and the at least one additional inlet of a second initial stage contactor, the working fluid conduit further comprising a heater, a heat exchanger, or a combination thereof, the working fluid conduit containing a working fluid containing 95 vol % or more.

DETAILED DESCRIPTION

Figure 1:
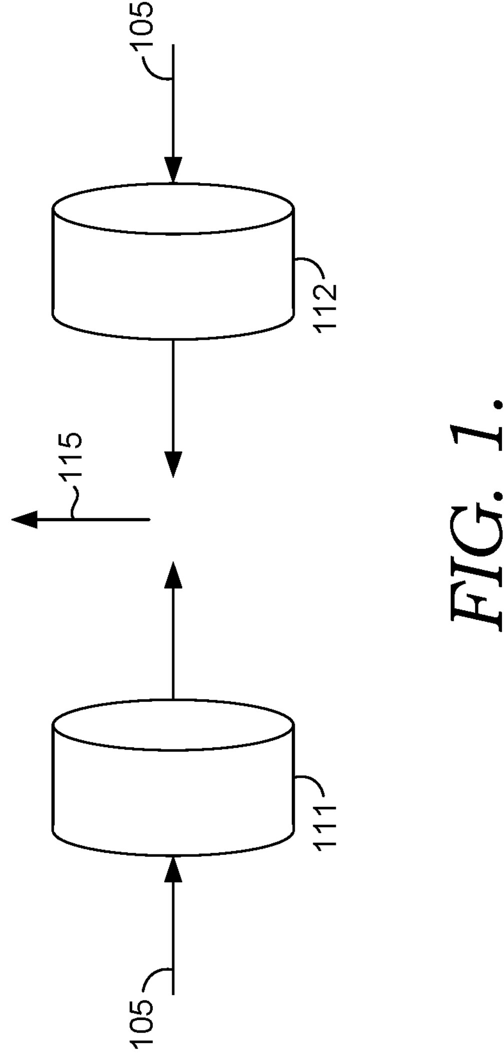
FIG. 1 shows an example of a sorption step in an initial separation stage.

All numerical values within the detailed description and the claims herein are modified by "about" or "approximately" the indicated value, and take into account experimental error and variations that would be expected by a person having ordinary skill in the art.

Overview

In various aspects, systems and methods are provided for using a multi-stage capture process for capture of $CO_2$ from air. Instead of attempting to directly produce a high purity $CO_2$ stream from $CO_2$ desorbed from air, a multi-stage sorption process is used. A first or initial sorption process is used to sorb $CO_2$ from air. After sorption from the air is complete, the desorption step of the initial stage is used to form a secondary $CO_2$-containing stream (corresponding to an initial stage effluent) that is passed into one or more additional sorption stages. This secondary $CO_2$-containing stream can be at a concentration of roughly 1.0 vol % or more. Sorption of $CO_2$ from the secondary $CO_2$-containing stream is performed using a different contacting method, such as a contacting method that is higher efficiency, but that would have an unreasonably high cost of operation at the higher gas volumes required for one-step capture of $CO_2$ from air. Even though the process involves a plurality of $CO_2$ sorption stages, substantial savings in capital costs and/or operating costs (e.g., energy usage) can be achieved by tailoring the stages to manage the challenges associated with each stage. In particular, the initial $CO_2$ sorption stage can be focused on reducing costs associated with dilute capture, while the second (or later) $CO_2$ sorption stage can focus on reducing costs associated with producing a $CO_2$-containing output stream with a $CO_2$ concentration of 80 vol % or more, or 90 vol % or more, or 95 vol % or more, such as up to being a substantially pure $CO_2$-containing output stream. This high purity output stream can then be sequestered and/or used for further processing in any convenient manner. Additionally, in some aspects, by using a plurality of stages, the transfer of heat from the first stage desorption step to the first stage sorption step can be improved, providing further reduction in operating cost.

Conventionally, amine scrubbing is the industry standard technology for $CO_2$ capture at higher $CO_2$ partial pressures. For direct air capture processes, however, amine scrubbing would require an unfeasibly large footprint and capital expenditure. This is because the energy cost/equipment footprint/capital expenditure for amine scrubbing scales with the volume of gas that is passed through the amine scrubbing system. As a result, sold amine adsorbents using structured contactors are currently the preferred means of amine based direct air capture.

Conventional methods for performing direct air capture using solid sorbents have attempted to use a single $CO_2$ sorption stage to capture $CO_2$ from air (roughly 400 vppm of $CO_2$) while producing a $CO_2$-containing output stream containing 90 vol % or more of $CO_2$. In order to achieve this, conventional capture systems for direct air capture have complex contactors employing vacuum and steam, so that the high purity $CO_2$ stream can be produced. Additionally, due to the low concentration of $CO_2$, the solid sorbent needs to have a high enthalpy of sorption. As a result, direct air capture is conventionally viewed as a challenge in managing the energy that is needed to perform the sorption/desorption cycle.

It is noted that some conventional approaches for direct air capture have attempted to mitigate the above problems by mixing a higher $CO_2$ stream with the air prior to performing the capture process. While this can be effective for increasing the $CO_2$ content of the input flow to the separation process, it is difficult to achieve a net energy savings by addition of a higher $CO_2$-concentration flow to air. In particular, the higher $CO_2$-concentration flow has to come from somewhere, so the energy costs associated with producing that flow have to be factored in. Additionally, increasing the $CO_2$ concentration in air is the same process as decreasing the $CO_2$ concentration of the additional input flow. Any cost savings from separating the $CO_2$ in the air are likely to be more than offset by the additional costs incurred in separating the now more dilute $CO_2$ from the additional input flow.

Conventional approaches to performing direct air capture using solid sorbents have generally suffered from the fact that there are actually two separate, competing groups of challenges that need to be overcome. The first set of challenges is related to the goal of producing an output flow corresponding to a $CO_2$-containing stream with a $CO_2$ content of 80 vol % or more, or 90 vol % or more, such as up to being substantially entirely composed of $CO_2$. This type of output stream is required to allow for either further processing/use of the $CO_2$-containing output flow, or to allow for efficient sequestration/storage of the $CO_2$-containing output flow. Unfortunately, achieving this type of high purity $CO_2$ stream as an output flow constrains the options for performing the desorption cycle. In particular, use of a sweep gas to assist with desorption represents an additional diluent that requires subsequent removal. As a compromise, steam is used conventionally as a sweep gas, due to the ability to separate water from the $CO_2$ stream via condensation at temperatures near ambient conditions. However, steam is itself an energy-intensive product. Desorption is also typically facilitated by reducing the pressure to below 90 kPa-a (i.e., vacuum-assisted desorption). The use of steam as a sweep gas while performing vacuum-assisted desorption is a high energy cost combination of process steps, with energy costs that scale with the volume of sorbent that is exposed to the combination of increased temperature and reduced pressure. The conventional view that the primary concern during direct air capture is related to management of energy is largely based on the requirements for achieving a high purity $CO_2$ output flow.

The second set of challenges is related to the dilute nature of air as a $CO_2$-containing stream. Due to the low concentration of $CO_2$, the solid sorbent needs to have a high enthalpy of sorption. This assists with driving sorption of the $CO_2$ in spite of the dilute nature of the stream. However, such a high enthalpy of sorption means that a similar amount of energy input is needed to facilitate desorption during the desorption step of the process cycle. This results in the energy management challenge when attempting to produce a high purity $CO_2$ stream. However, even with a sorbent having a high enthalpy of sorption, the dilute nature of air as a $CO_2$-containing stream means that a large volume of sorbent is needed to capture a commercial scale amount of $CO_2$ in a reasonable time scale. Unfortunately, this large volume of sorbent also has to be exposed to the desorption process. As a result, the energy intensive desorption processes used in conventional direct air capture are scaled by the full volume of sorbent used for the capture of air. Thus, by only addressing the energy management factors, conventional solutions are addressing only half of the problems associated with direct air capture. The other challenges are related to management of the large volume flows of air that need to be processed.

In contrast to conventional methods, it has been discovered that energy savings can be achieved by performing $CO_2$ capture from air using a multi-stage sorption system. The multi-stage system allows the separate challenges involved in direct air capture to be handled in a substantially separate manner. For example, an initial stage can be used that has relatively low capital and/or processing costs per unit volume of air that is processed, so that the large volume of sorbent needed for sorbing $CO_2$ from air is not multiplied by the higher capital/energy usage/other operating costs associated with forming a high purity $CO_2$ stream. Instead, the initial separation stage is used to form a first stage effluent with a $CO_2$ concentration of roughly 1.0 vol % or more. This type of first stage effluent can be formed using a method that has substantially reduced capital costs and/or energy intensity per volume of $CO_2$ and/or per volume of air processed. For example, by only achieving a $CO_2$ concentration of 1.0 vol % to 5.0 vol %, use of reduced pressures (i.e., vacuum) can be avoided. Thus, all of the additional equipment footprint associated with performing a vacuum desorption process is not required, resulting in substantial capital cost savings. Energy savings are also achieved by avoiding the need to operate the pumps typically associated with a vacuum desorption process. The first stage effluent can then be passed into a second separation stage for separating the first stage effluent to form a high purity $CO_2$-containing stream. Because the first stage effluent has a substantially higher $CO_2$ concentration, the input gas flow volumes and/or contactor volumes associated with the second separation stage are substantially smaller than the input air flow volumes/contactor volumes associated with the first stage. This can allow a separation process with a higher capital costs/processing costs per volume to be used in the second stage, as the flow volumes/contactor volumes associated with the second stage will be substantially lower. In some aspects, the flow volumes and/or contactor volumes associated with the second stage can be smaller than the flow volumes and/or contactor volumes associated with the first stage by a factor of 20 or more, or 25 or more, or 50 or more, or 100 or more, such as up to a factor of 250 or possibly still higher. As an example, an amine tower is an example of a separation process that can produce a $CO_2$-containing stream with a purity of 90 vol % or more, or 95 vol % or more, such as up to 99 vol % or possibly still higher. The volume of amine tower required to process a $CO_2$-containing input flow is primarily driven by hydraulic considerations (e.g., the volume flow rate of the input flow). Using a first stage to convert air containing roughly 400 vppm of $CO_2$ into a first stage effluent containing roughly 10,000 vppm of $CO_2$ means that the size of the amine tower used to capture the $CO_2$ from the first stage effluent can be smaller than the size of the corresponding amine tower to directly capture the $CO_2$ from air by a factor of 25. As a practical matter, this would mean using only 1 amine tower instead of 25 amine towers to process a given amount of $CO_2$.

Conventionally, it would be expected that using multiple stages for a sorption process would result in capital and/or operating costs that increase in a manner that is roughly proportional to the number of stages. This is due in part to the fact that each stage will separately require swings in one or more process variables (e.g., temperature, pressure) in order to move from sorption conditions to desorption conditions, and then back to sorption conditions again. However, due to the large disparity in the flow volumes and/or contactor volumes associated with the initial separation stage and the second separation stage, it has been discovered that the capital costs and/or operating associated with each stage can be separately mitigated, allowing for a net improvement in capital and/or operating costs even though multiple stages are used.

It has further been discovered that by using a modified sorption/desorption cycle for the first stage, additional energy savings can be achieved. One aspect of the modified separation process in the initial separation stage is that the sorption/desorption cycle is managed using a working fluid that includes a substantial amount of nitrogen. Conventionally, use of nitrogen as a working fluid is avoided. This is understandable in a conventional system, as nitrogen is the primary component of air. In a conventional direct air capture process, using nitrogen as a working fluid would result in adding back in the same diluent that the separation process is designed to remove. Thus, conventional direct air capture processes use steam as a working fluid, so that a simplified method (condensation) is available for removing the steam from the high purity $CO_2$-containing product. However, in the multi-stage separation process described herein, the $CO_2$ concentration in the first stage effluent is between 1.0 vol % to 5.0 vol %, or 1.0 vol % to 3.5 vol %, or 1.0 vol % to 2.0 vol %, or 1.5 vol % to 5.0 vol %, or 1.5 vol % to 3.5 vol %, or 2.0 vol % to 5.0 vol %, or 2.0 vol % to 3.5 vol %. Thus, the output flow from the initial stage already has a substantial diluent content, so that the presence of nitrogen in the working fluid is not detrimental. By using a working fluid with a substantial nitrogen content, the use of steam in the initial desorption stage can be reduced, minimized, or eliminated. This avoids the substantial costs associated with using steam to heat and/or desorb $CO_2$ from the large sorbent volumes associated with the initial separation stage.

Another aspect of the modified separation process is that the separation in the initial separation stage can be performed while maintaining a pressure in the initial separation stage of 90 kPa-a or more, or 95 kPa-a or more, or 100 kPa-a or more. In other words, vacuum-assisted desorption is not performed. This represents another substantial energy savings relative to a conventional process. The initial stage avoids the use of steam as a desorption fluid, as well as avoiding the need to generate pressures below 90 kPa-a during desorption. Due to the large contactor volumes involved in processing air for $CO_2$ capture on a commercial scale, avoiding the use of steam and/or sub-ambient pressures provides a substantial cost savings. In some aspects, the cost reduction in the initial stage may be partially offset by operating the initial stage at a pressure greater than 110 kPa-a.

Still another aspect of the modified separation process is that the working fluid in the initial separation stage also contains 0.08 vol % to 0.5 vol % of $CO_2$ even prior to being used for desorption of $CO_2$ from a sorbent bed. Conventionally, addition of $CO_2$ to a working fluid would be viewed as a disadvantage, as this would likely mean that previously separated $CO_2$ was being recycled and mixed with a lower concentration input flow. However, in various aspects, the working fluid can be generated as a by-product or side stream from the second separation stage. For example, when the second separation stage corresponds to a steam and vacuum-assisted sorption/desorption cycle with a solid sorbent, the sorption/desorption cycle will generally produce a secondary effluent with a relatively low content of $CO_2$. This secondary effluent can be used as at least a portion of the working fluid.

Yet another aspect of the modified separation process is that the initial separation stage generates a $CO_2$-containing effluent having a substantially smaller volumetric flow than the air input flow for the initial separation stage. The initial stage effluent has a $CO_2$ concentration of 1.0 vol % or more, or 1.5 vol % or more, or 2.0 vol % or more, such as up to 5.0 vol % or possibly still higher. By contrast, the $CO_2$ content of the input flow to the initial stage will typically be 500 vppm or less (such as the roughly 400 vppm present in air). Based on the relative $CO_2$ concentrations, this means that the volume of initial stage effluent is lower than the volume of the input flow to the initial stage by at least a factor of 20. In aspects where the input flow to the initial stage has a $CO_2$ concentration of roughly 400 vppm and the initial stage effluent has a $CO_2$ concentration of 1.0 vol % (10,000 vppm) or more, the reduction in flow volume corresponds to at least a factor of 25.

This reduction in volume flow to the second separation stage provides substantial reductions in the energy consumed and/or other processing costs for production of a high purity $CO_2$-containing output flow. For example, in some aspects the second separation stage can correspond to an amine scrubber and/or another type of separator where the volume and energy costs scale proportionally with the volume of the input gas flow to the separation stage. In such aspects, using the initial separation stage to form an initial stage effluent where the volume is reduced by a factor of 20 or more, or 25 or more, (such as up to 100 or possibly still more) provides a corresponding decrease in the size and associated energy costs for operating the stage. In other aspects, the second separation stage can correspond to a separation based on using a solid sorbent, such as a temperature swing and vacuum-assisted solid sorbent separation stage. In such aspects, reducing the volume of input flow to the second separation stage allows for a reduction in the volume/mass of sorbent that is required to perform the separation, with a corresponding reduction in energy costs for performing the separation. Because the processing costs with the second (and/or subsequent) separation stage are reduced dramatically, the combination of the processing costs for the initial separation stage and the second separation stage can still be below the processing costs for a single separation stage.

Still further reductions in volume/mass for the sorbent in the second stage can be achieved by operating the process loop corresponding to the initial stage desorption step, initial stage cooling step, and second separation stage at pressures greater than 110 kPa-a. In various aspects, at least a portion (such as up to substantially all) of the input flow to the second separation stage corresponds to at least a portion of the desorption effluent from the first or initial separation stage. If the initial stage effluent is at a pressure greater than 110 kPa-a, the volume of the initial stage effluent is further reduced, resulting in further reductions in the volume of the input flow to the second separation stage. In addition to potentially reducing the volume required for the second separation stage, pressurizing the input flow to the second separation stage provides a corresponding proportional increase in the partial pressure of $CO_2$ in the input flow. This can be beneficial for increasing the throughput in the second separation stage, which can then allow for further increases in the number of first stage contactors that can be paired with a given volume for the second separation stage. Generally, operating with a pressurized working fluid can increase the operating cost of the overall system (first separation stage plus second separation stage). However, capital costs for equipment plus the required equipment footprint can be reduced when using a pressurized working fluid. Thus, selecting operation with a working fluid at near ambient pressure versus a working fluid at pressures greater than 110 kPa-a can depend on trade-offs between which type of benefit is more valuable (reduced operating cost versus reduced capital cost/equipment footprint).

Using a nitrogen-based working fluid can provide still other benefits. For example, for sorbents (such as amine-based sorbents) that can potentially degrade in the presence of oxygen at elevated temperatures, using a nitrogen-based working fluid can avoid the need to make trade-offs between heating or cooling the sorbent due to concern about the presence of oxygen in the sorbent environment. In conventional systems, such trade-offs occur because steam is used as the primary purge and temperature control fluid. By reducing, minimizing, or avoiding the use of steam, concerns about condensation of water can also be reduced while allowing for more flexibility in recovering heat to minimize energy costs.

First and Second Separation Stages

A sorption/desorption cycle for sorption of $CO_2$ by a solid sorbent can typically include at least three steps. A first step in the process cycle corresponds to an adsorption step, where the loading of $CO_2$ on the sorbent is increased by exposing the sorbent to $CO_2$-containing input flow under sorption conditions. This also generates an exhaust stream that is depleted in $CO_2$ relative to the input flow. In the initial sorption stage, the input flow can include a substantial portion of air, such as being composed entirely of air. For the second (or subsequent) separation stage(s), the input flow can include a substantial portion of an effluent from the initial separation stage, such as being composed entirely of an effluent from the initial separation stage. A second step in the process is a desorption step. The desorption step generates an effluent that is enriched in $CO_2$ relative to the input flow to the sorbent environment. The third step in the process is a step to return the sorbent/sorbent environment to the conditions for performing the next sorption step. For example, in aspects where air and/or another oxygen-containing input flow is the feed for the sorption step, amine-based solid sorbents typically need to be cooled after desorption and prior to exposure to the input flow.

In various aspects where direct air capture is performed via a multi-stage separation process, the goal of the initial sorption stage can be to generate an initial stage output flow (i.e., an initial stage effluent) having a $CO_2$ concentration of 1.0 vol % or more, or 1.5 vol % or more, or 2.0 vol % or more, such as up to 5.0 vol % or possibly still higher. At least a portion of this initial stage effluent can then be passed into a second sorption/desorption stage. The second separation stage (and/or optional further additional separation stages) is then used to separate the initial stage effluent to form at least a high purity $CO_2$-containing stream and stream corresponding to at least a portion of the working fluid.

Figure 2:
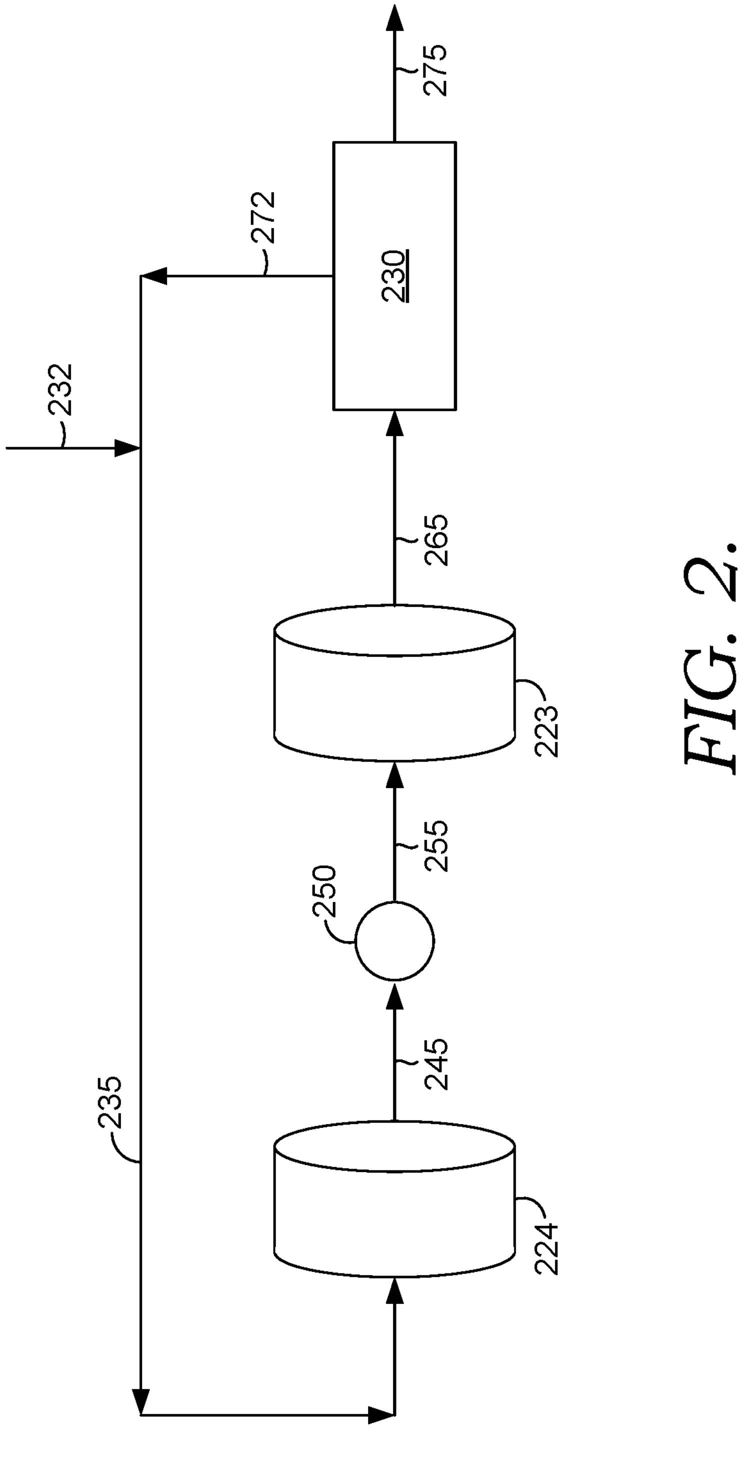
FIG. 2 shows an example of a process flow loop for integrating the desorption and cooling steps of an initial separation stage with a second separation stage.

FIG. 1 and FIG. 2 show an example of a process flow for implementing a two-stage $CO_2$ capture process. In FIG. 1, a portion of the process flow for the initial separation stage is shown. FIG. 1 shows an example of the $CO_2$ sorption step in the initial stage of the two-stage $CO_2$ separation process. During the $CO_2$ sorption step, a large plurality of sorbent beds are exposed to a flow of air (and/or another fluid having a $CO_2$ concentration of 600 vppm or less, or 500 vppm or less, or 400 vppm or less, such as down to 100 vppm or possibly still lower. FIG. 1 shows an example of exposing sorbent beds 111 and 112 to air 105 in order to use the sorbent to capture a portion of the $CO_2$ from the air. This also results in formation of a $CO_2$-depleted air flow 115 (decarbonized air). In other aspects, any convenient number of sorbent beds can be exposed to air during a sorption process. Due to the relatively low concentration of $CO_2$ in air, achieving a target loading of $CO_2$ on a sorbent can take a relatively long time. The target loading can correspond to an equilibrium loading of $CO_2$ at the sorption temperature, a fraction of the equilibrium loading, a loading that is achieved after a fixed time, or another convenient target value. By using a large plurality of sorbent beds, at any given time a majority of the sorbent beds can perform the $CO_2$ sorption step. A smaller number of beds at any given time can perform the various desorption/regeneration processes that are needed to return a sorbent bed to a condition where it is ready to perform additional sorption of $CO_2$. This can allow an increased amount of $CO_2$ to be sorbed on a sorbent bed prior to desorbing $CO_2$ to form the first stage effluent while still allowing the second stage of the separation process to operate in a substantially continuous manner.

FIG. 2 shows how the cooling and desorption steps of the initial separation stage are integrated with the second separation stage via use of a working fluid. In FIG. 2, at least two sorbent beds are involved in the portion of the process flow that integrates the desorption and cooling steps with the second separation stage. At least one sorbent bed 223 can be in the desorption step of the process cycle, while one or more sorbent beds 224 can be in the cooling step of the process cycle. It is noted that the cooling step comes after the desorption step in the process cycle. Thus, the one or more sorbent beds 224 correspond to sorbent bed(s) that have already completed the desorption step of the process cycle. A working fluid 235 is used to assist with managing the temperature of the at least one sorbent bed 223 and the temperature of the one or more sorbent beds 224. The working fluid 235 can also act as a sweep gas for the at least one sorbent bed 223 that is in the desorption step of the sorption/desorption cycle.

In the example process flow shown in FIG. 2, after exiting from second separation stage 230, working fluid 235 is at a relatively low temperature. In some aspects, the temperature of working fluid 235 after leaving second separation stage 230 can be 40° C. or less, or 30° C. or less, such as down to 0° C. or possibly still lower. The working fluid 235 is first passed into the one or more sorbent beds 224 that are in the cooling step of the sorption/desorption cycle. At the beginning of the cooling step, the one or more sorbent beds 224 can be at a temperature of 40° C. to 200° C., or 100° C. to 200° C., or 125° C. to 200° C., or 40° C. to 150° C., or 100° C. to 150° C., or 40° C. to 100° C. Exposing the working fluid 235 to the one or more sorbent beds 224 results in cooling of the one or more sorbent beds 224 while also forming a partially heated working fluid 245. The flow rate of working fluid 235 and length of the cooling step can be selected so that the one or more sorbent beds 224 are at or below a target temperature for starting the next sorption step in the process cycle. The target temperature for starting a sorption step can be 130° C. or less, 115° C. or less, 100° C. or less, or 85° C. or less, or 70° C. or less, or 55° C. or less, such as down to 10° C. or possibly still lower.

In some aspects, additional cooling can be achieved during the cooling step by recycling (not shown) at least a portion of the output flow from the one or more sorbent beds 224 (i.e., at least a portion of partially heated working fluid 245) back to the entry of the one or more sorbent beds 224. By recycling a portion of the output flow back to the input, the volume of gas available for cooling the one or more sorbent beds 224 can be increased without causing a corresponding increase in the total volume of gas in the overall working fluid loop. Optionally, the recycle loop for the one or more sorbent beds 224 can include a heat exchanger, to allow for cooling of the recycled gas flow.

The partially heated working fluid 245 can then be further heated 250 to form heated working fluid 255. Heating 250 can be performed using any convenient method, such as heat exchange, electrical heating, or heating in a furnace. Heating 250 is used to increase the temperature of heated working fluid 255 to a target temperature for use in the desorption step. In various aspects, the heated working fluid can be heated to a target temperature of 100° C. or more, or 125° C. or more, or 150° C. or more, or 170° C. or more, such as up to 210° C. or possibly still higher. The heated working fluid 255 is then passed into the at least one sorbent bed 223 that is in the desorption step of the sorption/desorption cycle. The heated working fluid 255 heats the at least one sorbent bed 223 to assist with desorption of sorbed $CO_2$. This results in production of a first stage effluent 265. The desorption of the sorbed $CO_2$ is endothermic, so the first stage effluent 265 will be at a lower temperature than the temperature of the heated working fluid 255. In various aspects, the temperature of the first stage effluent can be between 70° C. to 200° C., or 100° C. to 200° C., or 125° C. to 200° C., or 70° C. to 150° C., or 100° C. to 150° C., or 70° C. to 100° C. It is noted that by using a working fluid, heat can be effectively transferred from the one or more beds 224 that are in the cooling step to the at least one bed 223 that is in the desorption step. This reduces or minimizes the amount of energy required to achieve desorption of $CO_2$ during the desorption step of the sorption/desorption cycle. In addition, heating with a working fluid decreases the partial pressure of $CO_2$ in the gas phase, allowing for a lower temperature of stream 255. This lower temperature is important for many solid amine adsorbents, where elevated temperatures can result in degradation.

The first stage effluent 265 is then passed into a second separation stage 230. The second separation stage 230 can be any convenient type of separation stage for separating an input flow containing 1.0 vol % or more of $CO_2$ to form a) a $CO_2$ output flow 275 having a $CO_2$ concentration of 80 vol % or more, or 90 vol % or more, and b) at least one additional output flow 272 (corresponding to at least a portion of the working fluid) that contains a majority of the nitrogen from first stage effluent 265. Examples of separation methods that can form such a $CO_2$ output flow when starting with an input flow containing 1.0 vol % or more of $CO_2$ include, but are not limited to, a liquid amine scrubbing process or a single stage vacuum temperature swing adsorption process. After removing the $CO_2$ to form the $CO_2$ output flow, the additional output flow 272 can be formed from the remaining portion of the initial stage effluent. The additional output flow 272 can have a $CO_2$ content of 0.08 vol % to 0.5 vol %. The additional output flow 272 also corresponds to a nitrogen-enriched gas flow, with an $N_2$ content of 95 vol % or more, or 97 vol % or more, or 99 vol % or more, such as up to being composed substantially of only $CO_2$ and $N_2$. Optionally, a flow of make-up gas (such as make-up nitrogen 232) can be added to additional output flow 272 to maintain a desired volume of gas within the working fluid loop.

In addition to the above flows, a purge flow (not shown) is also generated during the transition of a sorbent bed from an adsorption step to the cooling/desorption loop. At the end of an adsorption step, the void space within a sorbent bed is full of air with 21% oxygen. To prevent build up of oxygen within the working fluid loop, nitrogen or another convenient purge gas can be passed through the sorbent bed prior to connecting the sorbent bed to the working fluid loop. For example, roughly 1 bed volume of nitrogen can be passed through the sorbent bed to push out the air prior to connecting the sorbent bed to the working fluid loop. The effluent from this mini-purge step is vented to the atmosphere.

Figure 3:
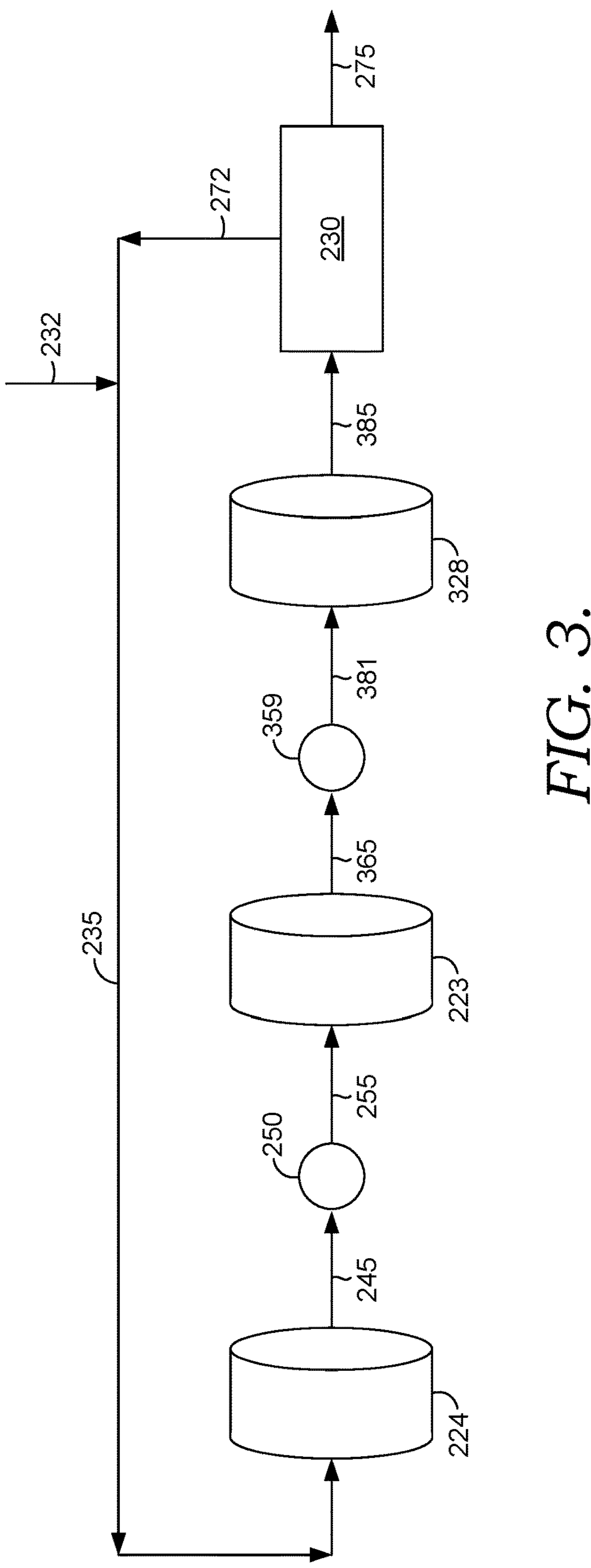
FIG. 3 shows another example of a process flow loop for integrating the desorption and cooling steps of an initial separation stage with a second separation stage.

FIG. 3 shows another example of a process flow for using a working fluid generated by the second separation stage as part of the cooling and desorption steps in the initial separation stage. The overall process flow in FIG. 3 is similar to the process flow in FIG. 2. The desorption output flow 365 contains roughly 1.0 vol % or more of $CO_2$, or 1.5 vol % or more, or 2.0 vol % or more, such as up to 5.0 vol % or possibly still higher. In FIG. 3, however, the desorption output flow 365 from the at least one sorbent bed 223 is not used as the first stage effluent. Instead, the desorption output flow 365 is passed through an additional heater 359 to form a heated desorption output flow 381. The heated desorption output flow 381 is then used to pre-heat one or more additional sorbent beds 328 that are at the start of the desorption step. The flow 385 exiting from the one or more additional sorbent beds 328 corresponds to an initial stage effluent that is then passed into second separation stage 230. The process flow in FIG. 3 can be beneficial in situations where the target desorption temperature is higher than the temperature at the end of the sorption step by 20° C. or more, or 30° C. or more, or 40° C. or more, such as up to 100° C. or possibly still more. In such aspects, using heated desorption output flow 381 to pre-heat the one or more additional sorbent beds 328 allows a portion of the heating prior to desorption to be performed using a stream with a composition that matches the output flow from the desorption step. Because the stream is heated, sorption of $CO_2$ on the sorbent substantially does not occur. Additionally, because the goal is pre-heating, the heated desorption output flow 381 can optionally be at a lower temperature than the heated working fluid 255. In various aspects, heated desorption output flow 365 can be heated to a temperature of 70° C. to 200° C., or 70° C. to 150° C., or 70° C. to 100° C., or 100° C. to 200° C., or 100° C. to 150° C. After exposure to the heated desorption output flow 365, the one or more additional beds 328 can be at a temperature of 50° C. to 125° C., or 50° C. to 100° C., or 50° C. to 85° C., or 70° C. to 125° C., or 70° C. to 100° C.

In various aspects, using the heated desorption output flow 381 to pre-heat the one or more additional sorbent beds 328 can allow the flow rate of working fluid to be reduced. This can be understood in the following manner. The total volume of gas needed to achieve a target temperature during the desorption step can be calculated based on the volume of sorbent. This volume of gas for achieving the target temperature during the desorption step is a constraint on the operation of the initial separation stage, and will often define the minimum required gas flow rate for the cooling and desorption step. In the configuration in FIG. 2, all of the heat provided for achieving the target desorption temperature is provided by heated working fluid 255. In the configuration shown in FIG. 3, a portion of the heat for achieving the target desorption temperature is provided by heated desorption output flow 381. Thus, in the process flow shown in FIG. 3, the volume of heated working fluid 255 can be reduced by an amount corresponding to the amount of heating provided by heated desorption output flow 381. Thus, the flow rate of working fluid in FIG. 3 can be reduced relative to FIG. 2 while still achieving the same target desorption temperature. It is noted that the reduction in flow rate in FIG. 3 is limited by the fact that heated desorption output flow 381 includes substantially all of heated working fluid 255. Therefore, reducing the flow rate for heated working fluid 255 also reduced the flow rate for heated desorption output flow 381.

The configurations in FIG. 2 or FIG. 3 can also provide benefits when operating the process flow so that the initial separation stage effluent is passed into the second separation stage at a pressure of 110 kPa-a or higher. For example, by increasing the pressure of the first stage effluent, the partial pressure of $CO_2$ in the second stage is increased by a corresponding amount for a given concentration of $CO_2$ in the first stage effluent. For many types of sorbents, increasing the partial pressure of $CO_2$ in the input flow results in corresponding increase in sorption efficiency during a sorption/desorption cycle. In some aspects, the initial separation stage effluent can be passed into the second separation stage at a pressure of 110 kPa-a or higher, or 150 kPa-a or higher, or 200 kPa-a or higher, or 300 kPa-a or higher, or 400 kPa-a or higher, such as up to 1000 kPa-a or possibly still higher. As an example, in either FIG. 2 or FIG. 3, the entire working fluid loop plus the second separation stage can be operated at elevated pressure in order to obtain the benefit of passing the initial separation stage effluent into the second separation stage at elevated pressure. In other aspects, a compressor can be used to increase the pressure of initial stage effluent 265 (FIG. 2) or 385 (FIG. 3). More generally, any convenient method for providing the initial stage effluent at elevated pressure can be used.

Sorbent Configurations

For the initial or first separation stage, the sorbent can correspond to a solid sorbent. Some common examples of solid amine-based adsorbents are metal organic frameworks (MOF) which have amines bound to open metal sites along the axis of the MOF crystal.[1-3] Other examples include amines which have been impregnated in solid supports such as MOF crystals, mesoporous silica, and activated carbons. Polymeric amines provide still another example of an amine-based solid sorbent. More generally, any convenient type of solid sorbent (amine-based or non-amine-based) can be used as a $CO_2$ sorbent in an initial capture stage. Examples of non-amine-based sorbents can include, but are not limited to, polymeric sorbents, MOFs, activated carbons, and mesoporous silica.

As a practical matter, the sorption step in direct air capture processes (where $CO_2$ is sorbed from a dilute flow such as air) necessarily operates at pressures near 100 kPa-a, in order to minimize costs associated with pressurizing large volumes of air. Due to this desire to minimize energy costs for pressurizing the large volumes of air, there is little tolerance for pressure drop through the sorbent structure for the initial separation stage. For this reason, in various aspects, structured adsorbents are used which allow for the pressure drop during the sorption step to be reduced or minimized. An example of this type of sorbent support structure is a parallel channel monolith.

Figure 4:
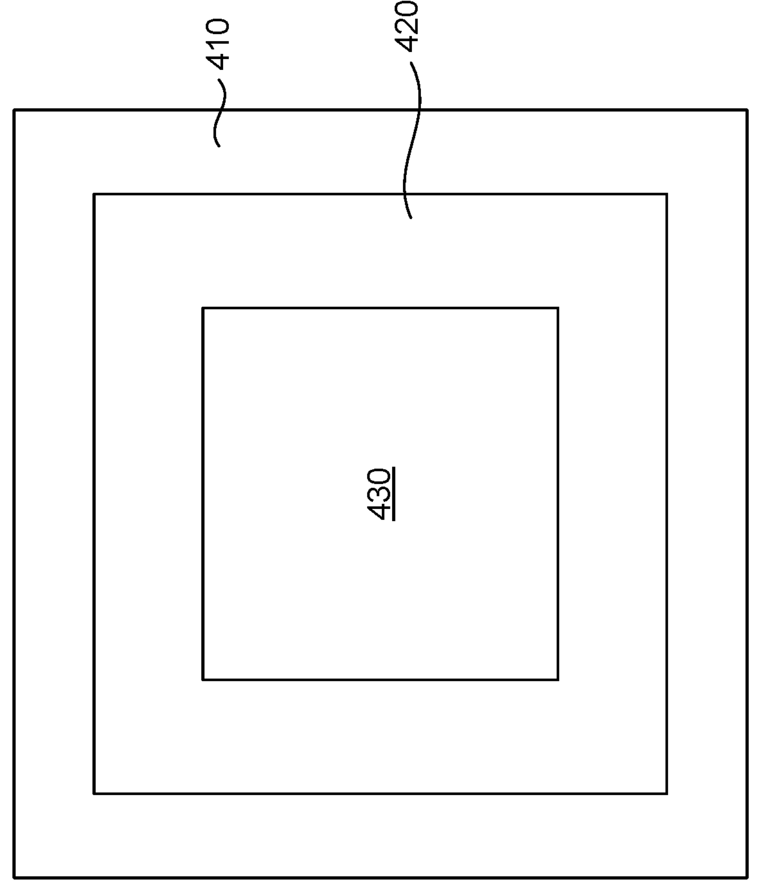
FIG. 4 shows an example of a flow channel of a parallel flow channel monolith.

Parallel channel monoliths (simply referred to as monoliths) provide a low pressure drop alternative to packed beds. The lower pressure drop allows for the design of much smaller contactors. In various aspects, monoliths are composed of three distinct regions: the solid monolith support, the sorbent layer, and the gas channel. FIG. 4 shows an example of a cross-sectional view of a channel in a monolith. The sorbent layer 420 is coated on the interior walls of the channel of solid support 410. In FIG. 4, the combination of solid support 410 and sorbent layer 420 define gas channel 430. It is noted that in other aspects, the monolith could be made entirely out of an active material, so that a separate sorbent layer is not coated on the interior walls. Similarly, a monolith can be formed from a mixture of an active material and binder, so that a separate sorbent layer is not required on the interior surfaces of the channels.

The solid monolith support can be formed from any convenient type of material. Stainless steel is an example of a reasonably low cost material that provides sufficient durability and structural support. In other aspects, monoliths can be formed from other materials, including (but not limited to) ceramics, metal oxides (such as alumina), or polymeric materials. Sorbents can be applied to monoliths via any convenient method, such as dip-coating or other methods for applying a washcoat to a monolith.

The sorbent layer contains adsorbent, binder and optionally macro voids. The sorbent layer can have any convenient composition that provides a target level of sorption capacity when applied to a monolith support. As an example, a sorbent layer can contain 60 vol % sorbent, 25 vol % binder and 15 vol % macro voids. In other examples, the sorbent content of a sorbent layer can range from 10 vol % to 90 vol % of the sorbent layer and 10 vol % to 90 vol % binder. Macro voids are optional. When macro voids are present, 0.1 vol % to 50 vol % of the sorbent layer can correspond to the macro voids. With regard to the gas channel, one option for characterizing the gas channels is based on specifying a number of cells per unit cross-sectional area (a cell density), in combination with specifying a percentage of the monolith cross-sectional area that corresponds to an open volume for passage of gas (i.e., cross-sectional area that is not part of the support material or the sorbent layer). In some aspects, a monolith can be used that has a cell density of 50 cells per square inch (cpsi) to 2000 cpsi, or 100 cpsi to 1000 cpsi. This corresponds to roughly 8.0 cells/$cm^2$ to roughly 310 cells/$cm^2$. Additionally or alternately, in some aspects a monolith can have an open cross-sectional area of 25% to 80%. In this discussion, the open cross-sectional area is defined based on a cross-section that is orthogonal to the average direction of gas flow within the monolith.

For the second separation stage, solid sorbents are one option for the sorbent material. Common examples of solid amine-based adsorbents are metal organic frameworks (MOF) which have amines bound to open metal sites along the axis of the MOF crystal.[1-3] Other examples include amines which have been impregnated in solid supports such as MOF crystals, mesoporous silica, and activated carbons. Polymeric amines provide still another example of an amine-based solid sorbent. More generally, any convenient type of solid sorbent (amine-based or non-amine-based) can be used as a $CO_2$ sorbent in a second separation stage. Examples of non-amine-based sorbents can include, but are not limited to, polymeric sorbents, MOFs, activated carbons, and mesoporous silica.

The support structure for the solid sorbent can be any convenient type of support structure. Examples of support structures for solid sorbents can include, but are not limited to, monoliths with sorbent supported on surfaces of the monolith; packed beds with sorbent supported on the particles used to form the packed beds; and/or porous substrates where the sorbent is supported in the pores and/or the sorbent forms part of the substrate. Because of the substantially lower gas volumes in the second separation stage, increasing the pressure of the input flows to the second separation stage to overcome pressure drops is substantially less costly from an energy standpoint. Thus, solid sorbent configurations that involve greater pressure drops, such as packed beds or porous substrates, can be used while still realizing substantial energy savings relative to conventional direct air capture configurations. Additionally or alternately, monoliths having the characteristics described for the sorbent support in the initial separation stage can be used.

When the second separation stage is operated using a solid sorbent, conventional $CO_2$ sorption and/or desorption conditions can be used for the sorption/desorption cycle. The sorption and/or desorption conditions can vary depending on a variety of factors, including the nature of the sorbent material. For sorption, this can include exposing the solid sorbent to the first stage effluent at a temperature between 0° C. and 100° C., while desorption is performed at a temperature between 70° C. and 170° C. Optionally, in some aspects where sorption is performed at a pressure of less than 110 kPa-a, the desorption can be performed at pressures of 90 kPa-a or less, or 75 kPa-a or less, or 50 kPa-a or less, such as down to 1.0 kPa-a or possibly still lower. In some aspects where sorption is performed at a pressure of 110 kPa-a or more (such as 150 kPa-a or more) the pressure during desorption can be lower than the pressure during sorption by 30 kPa or more, or 50 kPa or more, or 100 kPa or more, such as up to 1.0 MPa or possibly still more. Additionally or alternately, in such aspects the pressure during desorption can be 80 kPa-a to 120 kPa-a, or 90 kPa-a to 120 kPa-a, or 80 kPa-a to 110 kPa-a, or 90 kPa-a to 110 kPa-a.

Another option for a second separation stage can be to use a liquid-based amine system for $CO_2$ removal, such as a conventional amine scrubber.

It is noted that an additional benefit of the two-stage direct air capture configuration described herein is that issues related to amine degradation in the presence of oxygen are reduced or minimized. In a conventional single-stage $CO_2$ capture system, process cycles using amine-based sorbents are constrained by the potential for degradation of amine sorbents when exposed to $O_2$ at sufficiently high temperatures. While the amount of degradation varies depending on $O_2$ concentration and temperature, noticeable degradation can potentially start to occur at temperatures as low as 70° C. and/or at oxygen concentrations as low as roughly 1-2 vol %. As a result, for conventional single-stage capture systems, if the $CO_2$-containing gas entering the sorbent system (such as air or a flue gas) also contains $O_2$, the process cycle has to be carefully managed so that $O_2$ is not present within the sorbent environment at elevated temperatures. By contrast, for the multi-stage contactor described herein, the sorbent used for performing the initial capture of $CO_2$ from air is different from the sorbent environment that is used for producing the final high concentration $CO_2$-containing product. Thus, a purge step can be performed at the end of the initial adsorption step from air. This allows issues with $O_2$ to be substantially entirely avoided without impacting the productivity of the sorbent environment in the second separation stage.

Configuration Example—Contactor Array

Figure 5:
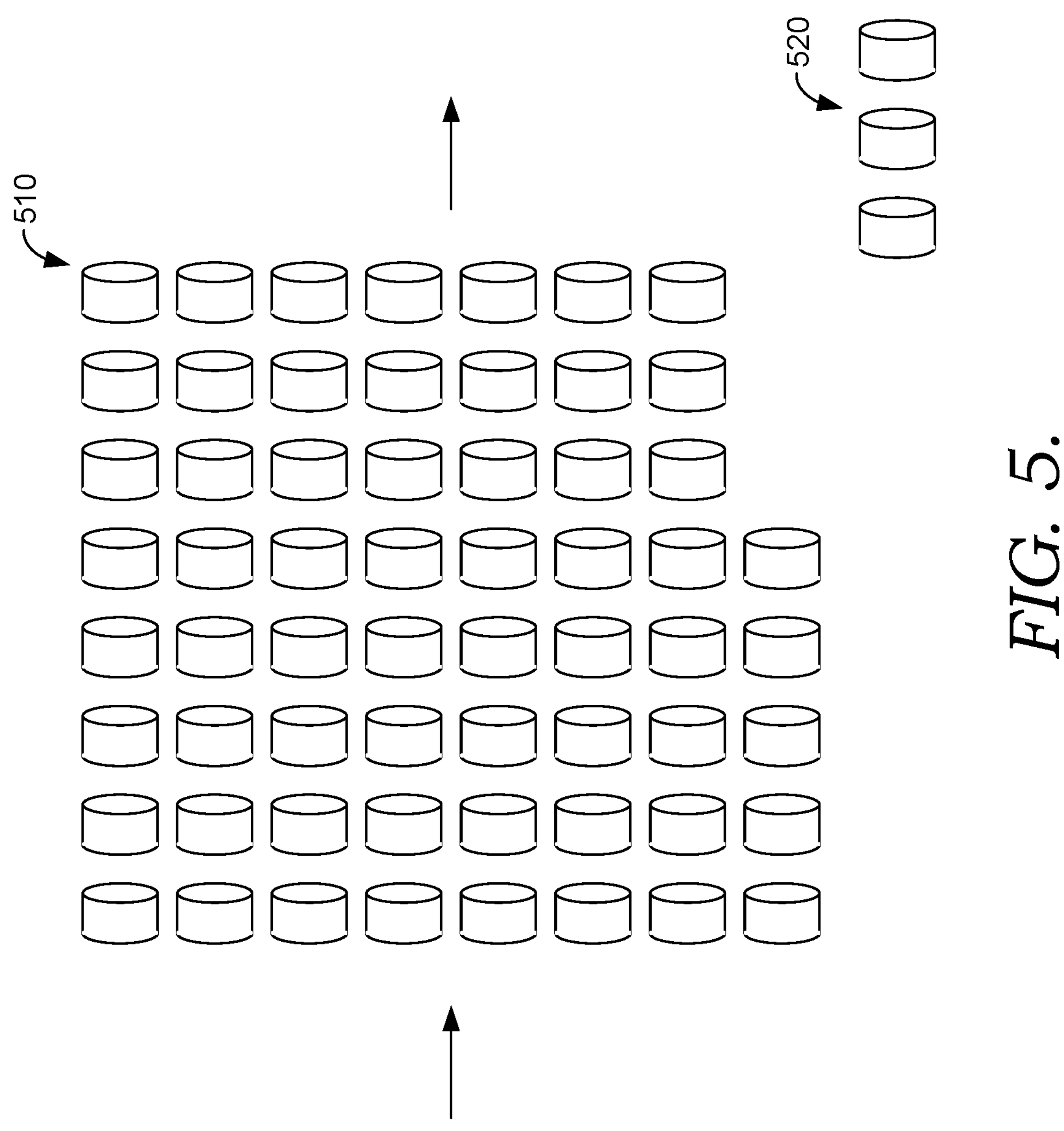
FIG. 5 shows a representation of a large plurality of contactors in various process steps in an initial separation stage.

Generally, one option for organizing the sorbent material used for initial sorbent stage is to have an array of contactors with duct work to allow for rotation of which contactor(s) are in fluid communication with the working fluid loop/second separation stage at any given time. Gas flow into and out of each contactor is controlled by valves, such as valves mounted on each contactor. In such a configuration, each contactor can provide a sorbent environment that contains one or more monoliths. An example of this type of configuration can be to use one or more skids that each support a (large) plurality of contactors. During operation, different adsorption beds are operating at different steps of a process cycle. For instance, several contactors may be adsorbing $CO_2$ from a gas stream, while only a single bed is in desorption, where the adsorbed $CO_2$ is being removed from the adsorbent. These contactors are connected via piping/ducting. FIG. 5 provides a representation of this type of configuration. In FIG. 5, a large array of contactors is represented. Although FIG. 5 shows an array containing 64 contactors, it is understood that any convenient number of contactors can be used as sorbents for the initial separation stage, such as up to hundreds or even thousands. In FIG. 5, the majority of the contactors 510 correspond to contactors performing a sorption step. The remaining three contactors 520 are in some part of the regeneration process, such as desorption or cooling.

One potential advantage of using an array of contactors (such as one or more skid-based arrays) is that each contactor is a separate enclosure. This can allow the desorption and/or cooling steps of the initial separation stage to be performed at pressures greater than roughly 110 kPa-a. Performing the desorption and/or cooling steps at higher pressures can allow the initial stage effluent to be generated at a pressure above 110 kPa-a. Increasing the pressure of the initial stage effluent (which eventually becomes the input flow for the second separation stage) can potentially provide a variety of advantages for the second separation stage. For example, in aspects where the second separation stage is performed using solid sorbents, increasing the pressure of the input flow to the second separation stage provides a corresponding increase in the partial pressure of $CO_2$ within the input flow. This can provide increased energy efficiency and/or reduced equipment footprint for the second separation stage apparatus.

An alternative to skid based processes are rotating wheels with sorbent beds composed of one or more monoliths. When using a rotating wheel, different portions of the sorbent bed are simultaneously in the sorption, desorption, and cooling steps of the sorption/desorption cycle. The timing for each of these steps is equivalent to defining the fraction of the wheel which is exposed to the gas flows for that step. As the wheel rotates, gas channels rotate between the various process steps, hence simulating the operation of a multi-bed skid, but with a single contactor in a continuous process. A benefit of rotating wheels is that the number of valves and length of piping are minimized, which in turn minimizes the pressure drop and resulting compression requirements. Further, rotating wheels result in more efficient use of plot space than skid based designs.

Figure 6:
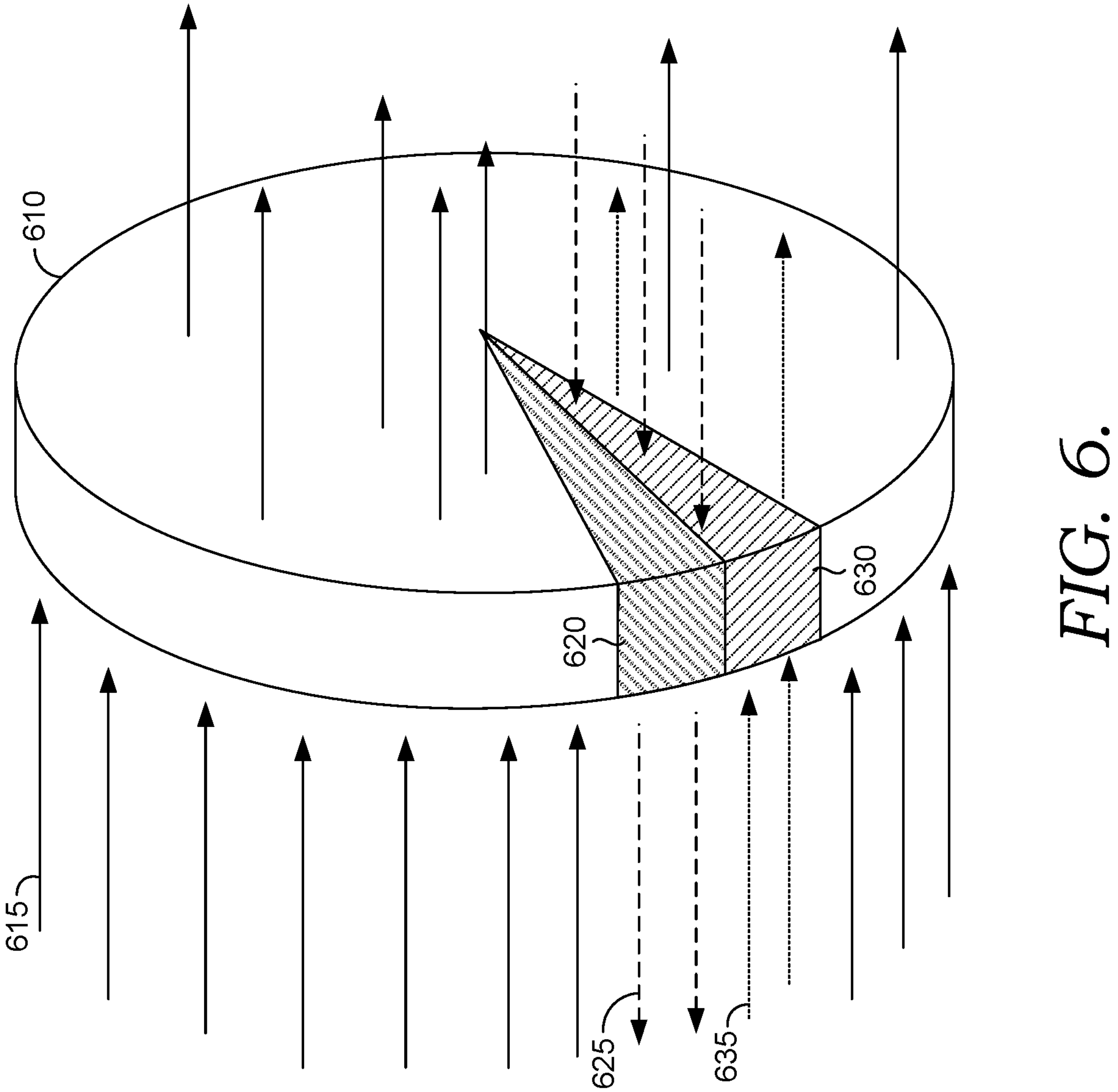
FIG. 6 shows an example of using a rotary wheel as a sorbent bed for an initial separation stage.

FIG. 6 illustrates an example of the partitioning for a rotary sorbent wheel for an initial separation stage process, such as the process illustrated in FIG. 2. Area 610 of the wheel represents the section of the wheel which is being fed air 615 (i.e., the adsorption step). Area 620 corresponds to the desorption step, which is performed while exposing area 620 to hot working fluid 625 for desorption. Area 630 corresponds to the cooling step, where area 630 is exposed to cool working fluid 635. Additionally, a small sliver of the bed (not shown) is in the displacement step. The displacement step section is an optional additional step that lies between the adsorption step 610 and desorption step 620 sections on the rotary wheel. During a displacement step, any air remaining in the volume of the sorbent bed after the adsorption step is displaced with a nitrogen-rich gas, such as working fluid or a high purity nitrogen steam. The volume of nitrogen can correspond to as little as the volume of the portion of the bed that is in the desorption step. The displaced gas generated during this step is released to the atmosphere, but it is understood that some of the nitrogen-rich gas may exit from the system as part of the displacement purge. The displacement step minimizes oxygen build up in the recycle gas.

Figure 7:
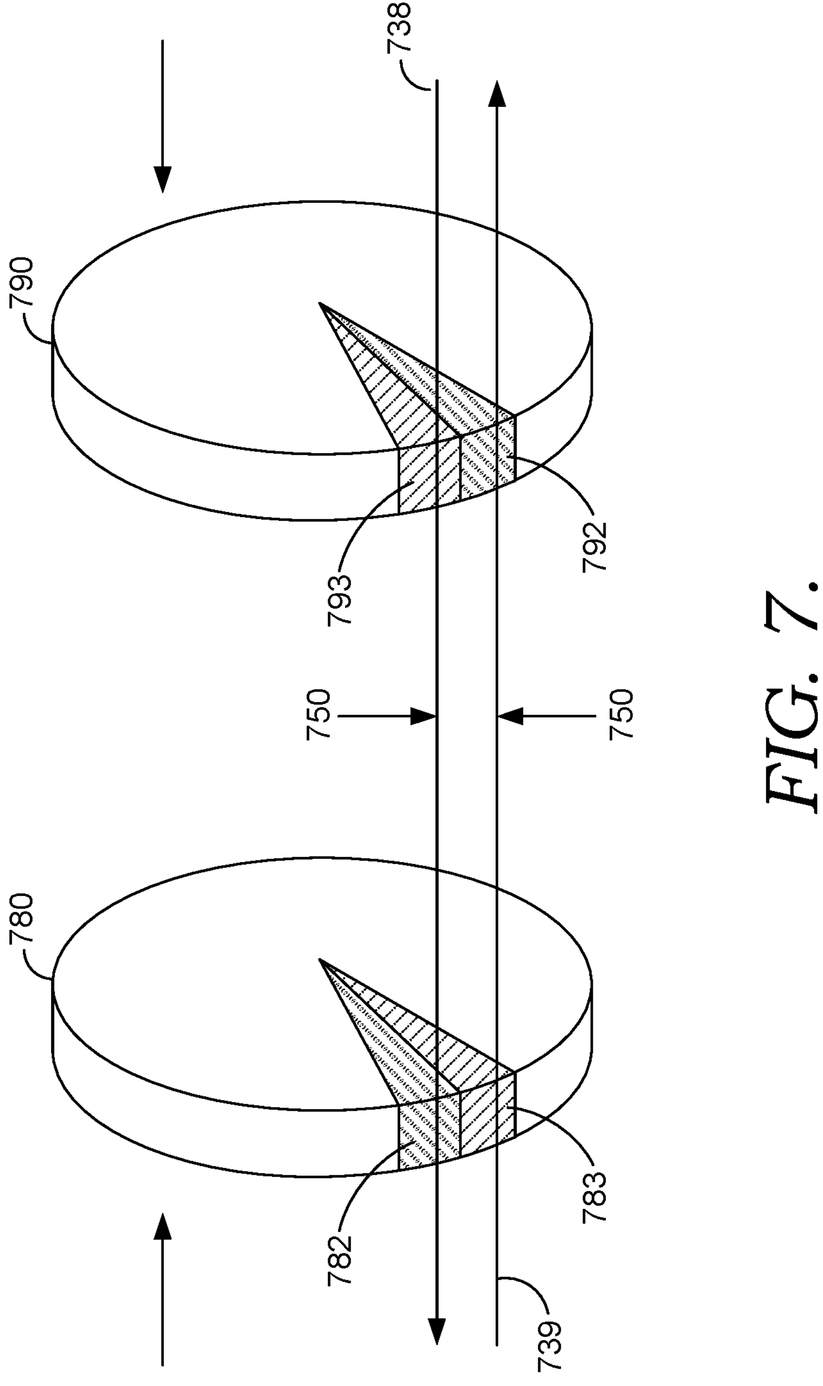
FIG. 7 shows an example of integration of two rotary wheels as sorbent beds in an initial separation stage.

FIG. 7 shows an example of how a pair of rotating wheel sorbent beds can be coupled to allow the rotating wheel beds to be integrated with a configuration where a working fluid is used during desorption and cooling, such as the configuration shown in FIG. 2. In FIG. 7, rotary wheels 780 and 790 are shown. The wheels rotate in opposite directions. This can allow the cooling step 783 of wheel 780 to be aligned with the desorption step 792 of wheel 790, while the cooling step 793 of wheel 790 is aligned with the desorption step 782 of wheel 780. The arrows represent the direction of gas flow for working fluid 738 and working fluid 739. Working fluid 739 is used for cooling step 783 of the wheel 780. This preheats the gas in working fluid 739 by transferring the heat from wheel 780 to the gas. The partially heated working fluid 739 is then passed through a heater 750 which heats the working fluid 739 to the desorption temperature. The heat working fluid 739 is then fed to desorption step 792 on wheel 790. Similarly, working fluid 738 passes through cooling step 793 of wheel 790, heater 750, and then desorption step 782 on wheel 780. It is noted that separate heaters (not shown) could be used for working fluid 738 and 739, as opposed to having a single heater 750.

Example 1—Process Simulations at Ambient Pressure

Processes corresponding to the first or initial separation stage of configurations similar to FIG. 2 were modelled in a customized process modelling suite, based on the commercially available gPROMS program, that incorporates mass, energy and momentum balances in combination with adsorption physics to model cyclic gas adsorption processes. The model was used to provide detailed representations of a single monolith unit cell, such as the cell shown in FIG. 4. Based on the ability to model individual cells, the simulations could be used to provide representative results for a target scale of operation.

The initial separation stage process is applicable to a variety of solid amine adsorbents. In the following examples, alkylamine-appended MOF adsorbent mmen-$Mg_2$(dobpdc) was used. "mmen" corresponds to N,N"-dimethyl ethylene diamine, while "dobpdc" corresponds to 4,4'-dioxidobiphenyl-3,3'-dicarboxylate. In the remainder of the document this material will simply be referred to as "MOF". The $CO_2$ adsorption isotherms for this material were taken from a journal article by Sinha et al (*Ind. Eng. Chem. Res.* 2017, 56, 750-764). Based on these published isotherms, model representations of the adsorption versus the partial pressure of $CO_2$ are shown in FIG. 8 for various temperatures.

Figure 8:
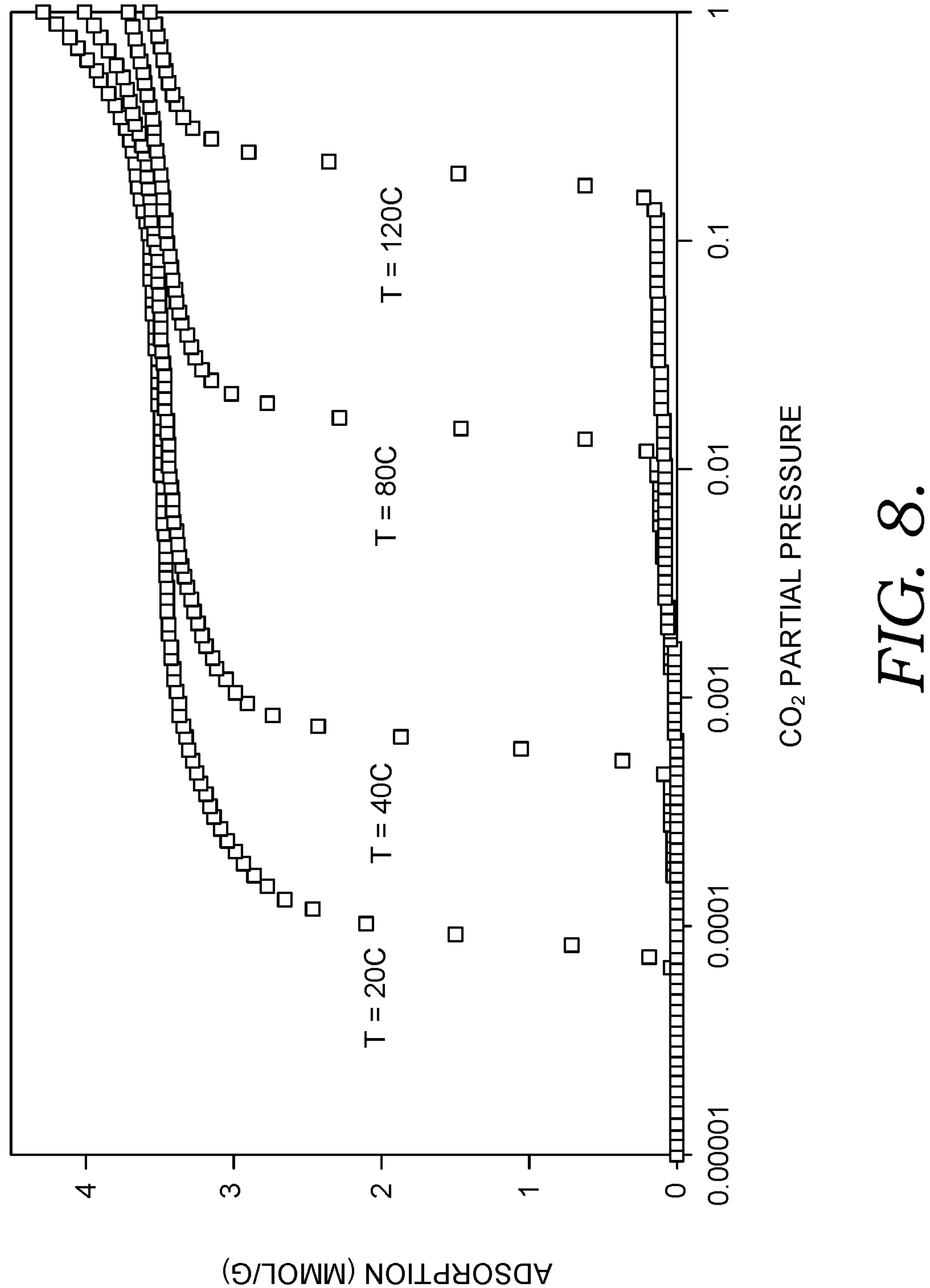
FIG. 8 shows $CO_2$ adsorption versus $CO_2$ partial pressure for an amine-appended metal organic framework material.

As shown in FIG. 8, the MOF exhibits a step isotherm. For partial pressures below the step ($P_{CO2}<P_{step}$) the MOF has very little capacity for $CO_2$, while at higher pressures ($P_{CO2}>P_{step}$) the MOF has a very high capacity. This on/off switch for adsorption comes with both benefits and challenges. A benefit of a step isotherm is that the adsorbent material can be substantially fully regenerated. However, this also leads to a challenge due to the fact that desorption is all or nothing. For this reason step isotherms can be more challenging to use in processes based on pressure swing desorption.

Another challenge with step isotherms is 'slip'. When flowing gas through an adsorption bed, the partial pressure of $CO_2$ in the exit gas will be approximately equal to the step pressure at that temperature ($P_{CO2}=P_{step}$). For example, for a direct air capture process with a feed composition of roughly 400 ppm of $CO_2$, in order to capture ~75% of the $CO_2$ from the air ($P_{step}$=100 ppm) using the MOF system selected for the process simulations, the temperature of the air feed to the process can be roughly ~20° C. For this reason, the process simulations used an air temperature of $T_{air}$=20° C. for the input air flow in the initial stage adsorption step. It is noted that other temperatures could be suitable depending on the choice of sorbent for the initial stage adsorption.

For the initial stage desorption step, in a pure temperature swing adsorption process (with no purge gas) at atmospheric pressure, the desorption temperature is simply the temperature at which $P_{step}$=1 atmosphere. This is a consequence of the step isotherm. However, in the current process, heat is being delivered by the nitrogen rich recycle gas (e.g., the working fluid). From a desorption perspective the recycle gas plays two roles, as the recycle gas both delivers the heat to the monolith as well as providing a partial pressure purge to sweep out desorbed $CO_2$. Based on FIG. 8, a desorption temperature of 150° C. would be needed in the absence of a purge gas. However, due to the presence of the recycle gas, similar results were obtained in the process simulations when using either 120° C. or 110° C. as the desorption temperature. The ability to use a lower temperature for the desorption step can be beneficial as it reduces potential degradation of the MOF through oxidation (from any residual oxygen that finds its way into the recycle loop) and amine volatilization.

The last temperature input for the process cycle is the temperature of the recycle gas leaving the second separation stage. In the examples below, the temperature of the recycle gas leaving the second separation stage was set as 40° C., which would be consistent with the second separation stage being an amine scrubber.

In the process simulations, it was assumed that the second separation stage removed 90% of the $CO_2$ fed into the system. It was also assumed that oxygen and nitrogen loses in the second separation stage were negligible. Under these assumptions, the species mole fractions in the recycle gas 235 in FIG. 2 were calculated according to the relationships in Equation (1).

$$y_{CO_2}^{S1} = \frac{0.1 y_{CO_2}^{S4}}{1-0.9y_{CO_2}^{S4}} \quad y_{O_2}^{S1} = \frac{y_{O_2}^{S4}}{1-0.9y_{CO_2}^{S4}} \quad y_{N_2}^{S1} = \frac{y_{N_2}^{S4}}{1-0.9y_{CO_2}^{S4}} \qquad \text{Equation (1)}$$

The process simulations did not attempt to specifically size the initial separation stage. This would require an accurate treatment of mass transfer and amine kinetics in the formulated coating. Instead, the gas channel velocities were assumed to be sufficiently low such that the assumption of equilibrium adsorption was satisfied. In the process simulations, a gas channel velocity of 2 m/s during the adsorption step was used. Any penalties due to kinetic limitations would be equally applicable to single stage and two stage processes. Table 1 summarizes the stream temperatures and compositions, both input and calculated. The numerals in the "stream" column of Table 1 correspond to reference numerals from FIG. 2.

TABLE 1

Stream Temperatures and Compositions

| | | | Mole Percentages | | |
|---|---|---|---|---|---|
| Stream | % Air feed | T (° C.) | $CO_2$ | $N_2$ | $O_2$ |
| Air feed | 100% | 20 | 0.04% | 78.96% | 21.0% |
| Decarbonized air | 100% | 20.9 | 0.01% | 78.99% | 21.0% |
| 235/272 | 3.1% | 40 | 0.11% | 99.8% | 0.1% |
| 245 | 3.1% | 77 | 0.12% | 99.7% | 0.1% |
| 255 | 3.2% | 120 | 0.12% | 99.7% | 0.1% |
| 265 | 3.3% | 47 | 1.10% | 98.8% | 0.1% |
| Displace feed | 0.01% | 40 | 0.00% | 100.0% | 0.0% |
| Displace vent | 0.01% | 20 | 0.04% | 95.61% | 4.35% |

The lean recycle gas, corresponding to 235 or 272 in FIG. 2, has a molar flowrate which is 3.1% of the air fed into the first separation stage concentrator process. This flowrate was obtained by optimizing the flowrate such that the adsorbent was sufficiently regenerated during the desorption step. The flowrate of 235/272 is inversely related to the composition of $CO_2$ in stream 265. For this case stream 265 has a $CO_2$ mole fraction of 1.1%. This is the gas concentration being fed to the second separation stage. It is desirable to increase the concentration of stream 265 further. This would allow for a lower flowrate of recycle gas, as well as increase the efficiency of the second separation stage process. The recycle gas flowrate will depend on the identity of the adsorbent material.

The effluent from the adsorption step is labeled decarbonized air. As expected, the process removes 75% of the $CO_2$ resulting in a decarbonized air $CO_2$ mole fraction of 100 ppm. Note, the air is heated by 0.9° C. as it passes through the bed on adsorption. This slight heating is a result of heat being transferred from the monolith (which is initially at 47° C.) to the gas, and not an effect due to the enthalpy of adsorption.

When stream 235/272 is used to cool the sorbent bed 224, which is hot from the desorption step, it is preheated from 40° C. to 72° C. (245) prior to being heated (250) to 120° C. (255). This heat integration allows for a more energy efficient process without the need to add large capital cost heat exchangers to the process. The required heating input to the system is calculated to be Q=2.7 GJ/ton $CO_2$.

In addition to heating duty, a blower must be used to blow air through the beds in the adsorption step, as well as transport the recycle gas through the loop and wheels. The pressure drop through the wheels is very low and was calculated to be 0.34 kPa. In total this yields a blower requirement of 0.8 GJ/ton $CO_2$.

The last step to consider is the displacement step. Before a gas channel enters into desorption, it contains air left in the gas channels from the adsorption step. If we were to immediately go to desorption by flowing hot recycle gas, the $O_2$ in the gas channel would enter recycle loop. To minimize amine degradation it is required to have low $O_2$ in the recycle loop. In the displacement step this air in the gas channel is displaced by a $N_2$ gas. In the current calculations we assumed pure $N_2$, however some small amount $O_2$ may be acceptable. The displaced gas is then released to the atmosphere. This step likely represents the majority of $N_2$ losses from the loop. The $N_2$ flowrate of the displacement step totals to 1.8 moles $N_2$ per mole of captured $CO_2$. If the $N_2$ were obtained through cryogenic distillation of air, this would incur an energy penalty of 0.21 GJ/ton $N_2$, resulting in a 0.38 GJ/ton $CO_2$ energy cost. So while the production of $N_2$ incurs a penalty, the low level of $N_2$ needed yields a relatively minor energy penalty.

Table 2 summarizes the stage 1 energy requirements. The total stage 1 energy requirement is 3.9 GJ/ton $CO_2$.

TABLE 2

Summary of First Separation Stage Energy Usage

| Item | GJ/ton $CO_2$ |
|---|---|
| Fans | 0.8 |
| Heater | 2.7 |
| $N_2$ Production | 0.4 |
| Total | 3.9 |

Example 2—Variations in Working Fluid Pressure

For the process simulations described in Example 1, the volume of gas in the working fluid loop (used in initial stage desorption and cooling steps) was roughly 3 vol % of the volume of air exposed to the initial stage contactor during the sorption step. This resulted in $CO_2$ partial pressures for the initial stage effluent of roughly 1.0 kPa to 1.5 kPa. Similar $CO_2$ partial pressures in the initial stage effluent were obtained when modeling other types of sorbents as well, such as polyethylene imine, other types of MOF-based amine sorbents, and amine gels. While this is a substantial improvement over the roughly 0.04 kPa in air, it could be advantageous to achieve a $CO_2$ partial pressure in the initial stage effluent of 4.0 kPa or higher. Achieving a $CO_2$ partial pressure of roughly 4.0 kPa or higher in the initial stage effluent (and therefore in the input flow to the second separation stage) would allow a conventional separation stage for separation of $CO_2$ from the flue gas of a natural gas combined-cycle power plant to be used as the second separation stage. In other words, an existing $CO_2$ separation technology could be used in the second separation stage while still achieving one or more of the benefits described herein.

One option for increasing the partial pressure of $CO_2$ in the initial stage effluent is to reduce the volume of working fluid by reducing the amount of nitrogen-rich recycle gas that is included in the working fluid. However, for the configuration shown in FIG. 2, the volume of nitrogen-rich recycle gas is constrained by the need to perform both heating and desorption during the desorption step. Another option for achieving a higher partial pressure of $CO_2$ is to pressurize the initial stage effluent.

In order to investigate options for increasing $CO_2$ partial pressure in the initial stage effluent, additional process simulations were performed using a configuration similar to FIG. 3. In the configuration of FIG. 3, the initial stage effluent undergoes an additional heating step. The additionally heated initial stage effluent is then used to pre-heat a sorbent prior to the desorption step. By providing a pre-heating step with a separately controlled temperature profile, additional variables are provided for controlling the heating of the sorbent bed to the desorption temperature. This can allow the volume of gas in the working fluid to be reduced while still achieving the target desorption temperature.

In the additional process simulations corresponding to the FIG. 3 configuration, the temperature of gas flow 272 (nitrogen-rich recycle stream from the second separation stage), which becomes working fluid 235, was set at 40° C. The temperature of the heated working fluid 255 (heated by heater 250) was set 120° C. The temperature of heated desorption output flow 381 (heated by heater 359) was set at 140° C. To investigate operation at elevated pressures, the pressure in the working fluid loop was set at roughly 101 kPa-a, 200 kPa-a, or 400 kPa-a. Table 3 shows the resulting $CO_2$ partial pressure associated with the working fluid loop, as well as the energy costs required to achieve the target pressure in the working fluid loop. The volume ratio of the volume of gas in the working fluid loop versus volume of air exposed to the sorbent bed in the initial adsorption step is also shown.

TABLE 3

Energy Costs for Variations in Pressure of Working Fluid Loop

| $P_{loop}$ (kPa) | $P_{CO2}$ (kPa) | $V_{loop}/V_{air}$ | Energy (GJ/ton CO2) Heat | Fans | Compression | Nitrogen | Total |
|---|---|---|---|---|---|---|---|
| 101 | 2.4 | 1.6% | 3.23 | 1.09 | 0.00 | 0.40 | 4.72 |
| 200 | 4.3 | 0.9% | 3.45 | 1.13 | 0.39 | 0.40 | 5.37 |
| 400 | 7.4 | 0.5% | 3.00 | 1.16 | 2.22 | 0.40 | 6.77 |

As shown in Table 3, increasing the partial pressure in the working fluid loop to 200 kPa-a resulted in a partial pressure of $CO_2$ of greater than 4.0 kPa. This would allow a system comparable to a $CO_2$ capture system for a natural gas combined cycle power plant to be used as the second separation stage. Part of the compression costs reflect that fact that after the cooling step, a sorbent bed has to be depressurized for use in the sorption step of the first separation, while a new $CO_2$-laded sorbent bed exiting from the sorption step needs to be pressurized.

Table 4 and Table 5 provide additional details from the process simulations related to the composition of the various gas flows. In Tables 4 and 5, the gas flows are identified in part based on the corresponding reference numeral from FIG. 3.

TABLE 4

Composition of Gas Flows for Working Fluid Pressure = ~101 kPa-a

| Stream | % of Air Feed Vol | Temp (° C.) | Pressure (kPa) | Mole Percentages $CO_2$ | $N_2$ | $O_2$ |
|---|---|---|---|---|---|---|
| Air Feed | 100 | 20 | 102 | 0.040% | 78.960% | 21.000% |
| Decarbonized Air | 99.96 | 20.9 | 101 | 0.007% | 78.986% | 21.006% |
| 235/272 | 1.58 | 40 | 103 | 0.245% | 99.664% | 0.091% |
| 245 | 1.58 | 108 | 102 | 0.214% | 99.694% | 0.091% |
| 255 | 1.42 | 120 | 102 | 0.214% | 99.695% | 0.091% |
| 365 | 1.45 | 74 | 102 | 1.674% | 98.236% | 0.090% |
| 381 | 1.61 | 140 | 102 | 1.674% | 98.236% | 0.090% |
| 385 | 1.62 | 30 | 101 | 2.401% | 97.509% | 0.089% |
| Displace Feed | 0.01 | 40 | 102 | 0.001% | 99.998% | 0.001% |

TABLE 4-continued

| Composition of Gas Flows for Working Fluid Pressure = ~101 kPa-a | | | | | | |
|---|---|---|---|---|---|---|
| | % of Air Feed | Temp | Pressure | Mole Percentages | | |
| Stream | Vol | (° C.) | (kPa) | $CO_2$ | $N_2$ | $O_2$ |
| Displace Vent | 0.01 | 108 | 101 | 0.040% | 93.283% | 6.677% |

As shown in Table 4, adding the additional pre-heating step used in FIG. 3 allowed for a substantial increase in the mole percentage of $CO_2$ in input flow for the second separation stage. In the configuration corresponding to FIG. 3, the flow 385 exiting from the pre-heating step has a $CO_2$ concentration of 2.4 mol %, while the flow 265 exiting from the desorption step in Example 1 had a $CO_2$ concentration of 1.1 mol %. Thus, simply adding the pre-heating step resulted in a substantial increase in $CO_2$ concentration to the second separation stage without performing any additional pressurization.

It is noted that in Table 4, the $CO_2$ content of the gas in the working fluid loop increases after both the desorption step (stream 365) and after the pre-heating step (385). This represents the fact that although the majority of the $CO_2$ is desorbed during the desorption step, some desorption does occur as the sorbent bed is being heated in the pre-heating step. Generally, the exact balance between how much $CO_2$ is desorbed during desorption versus desorbed during pre-heating is not critical, so the ratio of $CO_2$ desorbed during these two steps can be any convenient ratio.

TABLE 5

| Composition of Gas Flows for Working Fluid Pressure = ~200 kPa-a | | | | | | |
|---|---|---|---|---|---|---|
| | % of Air Feed | Temp | Pressure | Mole Percentages | | |
| Stream | Vol | (° C.) | (kPa) | $CO_2$ | $N_2$ | $O_2$ |
| Air Feed | 100 | 20 | 102 | 0.040% | 78.960% | 21.000% |
| Decarbonized Air | 99.96 | 20.9 | 101 | 0.008% | 78.986% | 21.006% |
| 235/272 | 1.76 | 40 | 202 | 0.218% | 99.699% | 0.083% |
| 245 | 1.75 | 107 | 201 | 0.160% | 99.757% | 0.083% |
| 255 | 1.62 | 120 | 201 | 0.160% | 99.757% | 0.083% |
| 365 | 1.64 | 78 | 201 | 1.479% | 98.439% | 0.082% |
| 381 | 1.76 | 140 | 201 | 1.479% | 98.439% | 0.082% |
| 385 | 1.76 | 28 | 200 | 2.136% | 97.782% | 0.081% |
| Displace Feed | 0.01 | 40 | 102 | 0.001% | 99.998% | 0.001% |
| Displace Vent | 0.01 | 107 | 101 | 0.040% | 93.282% | 6.678% |

As shown in Table 5, increasing the pressure resulted in a modest decrease in the $CO_2$ concentration in the input flow to the second separation stage. However, this decrease in $CO_2$ concentration is only on the order of 10-15%, while the pressure is doubled. Thus, operating the working fluid loop at a pressure near 200 kPa-a provides a substantial increase in $CO_2$ partial pressure for the input flow to the second separation stage. A still further decrease in $CO_2$ concentration was observed in the process simulations for a working fluid pressure of 400 kPa-a.

ADDITIONAL EMBODIMENTS

Embodiment 1. A method for separation of $CO_2$ from an input flow stream, comprising: exposing a first gas flow comprising 600 vppm or less of $CO_2$ to at least one first contactor of a plurality of contactors to form a first $CO_2$-depleted gas flow, the at least one first contactor comprising a first sorbent having selectivity for $CO_2$ sorption supported on one or more first monoliths, the exposing the first gas flow further forming a first sorbent comprising sorbed $CO_2$; exposing a second gas flow comprising 600 vppm or less of $CO_2$ to at least one second contactor of the plurality of contactors to form a second $CO_2$-depleted gas flow, the at least one second contactor comprising a sorbent having selectivity for $CO_2$ sorption supported on one or more monoliths, the exposing the second gas flow further forming a second sorbent comprising sorbed $CO_2$; exposing the first sorbent comprising sorbed $CO_2$ to a first heated working fluid to form a heated first sorbent and a first $CO_2$-containing working fluid comprising 1.0 vol % or more of $CO_2$, the first $CO_2$-containing working fluid formed by desorbing at least a portion of the sorbed $CO_2$ from the first sorbent comprising sorbed $CO_2$; exposing the heated first sorbent to a first nitrogen-enriched gas comprising 95 vol % of $N_2$ or more to cool the heated first sorbent and to heat the first nitrogen-enriched gas to form a partially heated working fluid; heating the partially heated working fluid to form a second heated working fluid; exposing the second sorbent comprising sorbed $CO_2$ to at least a portion of the second heated working fluid to form a heated second sorbent and a second $CO_2$-containing working fluid, the second $CO_2$-containing working fluid formed by desorbing at least a portion of the sorbed $CO_2$ from the second sorbent comprising sorbed $CO_2$; exposing the heated second sorbent to a second nitrogen-enriched gas comprising 95 vol % or more of $N_2$ to cool the heated second sorbent and to heat the second nitrogen-enriched gas to form a second partially heated working fluid; separating the first $CO_2$-containing working fluid to form at least a first product flow having a $CO_2$ concentration of 80 vol % or more and a first output flow comprising 95 vol % or more of $N_2$; and separating the second $CO_2$-containing working fluid to form at least a second product flow having a $CO_2$ concentration of 80 vol % or more and a second output flow comprising 95 vol % or more of $N_2$.

Embodiment 2. The method of Embodiment 1, wherein exposing the heated first sorbent to a first nitrogen-enriched gas comprising 95 vol % of $N_2$ further comprises exposing the heated first sorbent to a recycled portion of the first partially heated working fluid, the recycled portion of the first partially heated working fluid optionally being cooled prior to exposing the recycled portion of the first partially heated working fluid to the heated first sorbent.

Embodiment 3. The method of any of the above embodiments, wherein the first output flow comprises 0.08 vol % or more of $CO_2$, or wherein the second output flow comprises 0.08 vol % or more of $CO_2$, or wherein the first nitrogen-enriched gas comprises 0.08 vol % or more of $CO_2$, or wherein the second nitrogen-enriched gas comprises 0.08 vol % or more of $CO_2$, or a combination of two or more thereof, or three or more thereof.

Embodiment 4. The method of any of the above embodiments, wherein the volumetric flow rate of the first $CO_2$-containing working fluid is 5.0% or less of the volumetric flow rate of the first gas flow, or wherein the volumetric flow rate of the second $CO_2$-containing working fluid is 5.0% or less of the volumetric flow rate of the second gas flow.

Embodiment 5. The method of any of the above embodiments, further comprising: exposing the first sorbent comprising sorbed $CO_2$ to a pre-heating flow comprising 1.0 vol % or more of $CO_2$ and 95 vol % or more of $N_2$, the exposing the first sorbent comprising sorbed $CO_2$ to a pre-heating flow being performed prior to exposing the first sorbent comprising sorbed $CO_2$ to the heated working fluid; heating at least a portion of the first $CO_2$-containing working fluid; exposing a third gas flow comprising 600 vppm or less of $CO_2$ to at least one third contactor of a plurality of contactors to form a third $CO_2$-depleted gas flow, the at least one third contactor comprising a third sorbent having selectivity for $CO_2$ sorption supported on one or more third monoliths, the exposing the third gas flow further forming a third sorbent comprising sorbed $CO_2$; exposing the third sorbent comprising sorbed $CO_2$ to a third pre-heating flow comprising the at least a portion of the first $CO_2$-containing working fluid after the heating of the at least a portion of the first $CO_2$-containing working fluid; exposing the third sorbent comprising sorbed $CO_2$ to a third heated working fluid to form a heated third sorbent and a third $CO_2$-containing working fluid, the third $CO_2$-containing working fluid formed by desorbing at least a portion of the sorbed $CO_2$ from the third sorbent comprising sorbed $CO_2$; and exposing the heated third sorbent to a third nitrogen-enriched gas comprising 95 vol % of $N_2$ or more to cool the heated third sorbent and to heat the third nitrogen-enriched gas to form a third partially heated working fluid.

Embodiment 6. The method of any of the above embodiments, wherein the exposing the first sorbent comprising sorbed $CO_2$ to a first heated working fluid comprises exposing the first sorbent comprising sorbed $CO_2$ to the first heated working fluid at a pressure of 150 kPa-a or more.

Embodiment 7. The method of any of the above embodiments, wherein the first heated working fluid comprises a temperature of 100° C. to 170° C., or wherein the second heated working fluid comprises a temperature of 100° C. to 170° C., or a combination thereof, or wherein the first nitrogen-enriched gas comprises a temperature of 20° C. to 80° C., or wherein the second nitrogen-enriched gas comprises a temperature of 20° C. to 80° C., or a combination of two or more thereof, or a combination of three or more thereof.

Embodiment 8. The method of any of the above embodiments, wherein separating the first $CO_2$-containing working fluid comprises separating the first $CO_2$-containing working fluid using an amine scrubber; or wherein separating the first $CO_2$-containing working fluid comprises performing a temperature swing separation using a sorbent supported on a solid support; or wherein separating the first $CO_2$-containing working fluid comprises performing a temperature swing vacuum-assisted separation using a sorbent supported on a solid support; or a combination thereof.

Embodiment 9. The method of any of the above embodiments, wherein the first sorbent comprises an amine-based sorbent, or wherein the second sorbent comprises an amine-based sorbent, or a combination thereof.

Embodiment 10. The method of any of the above embodiments, further comprising exposing the first sorbent comprising sorbed $CO_2$ to a purge flow prior to exposing the first sorbent comprising sorbed $CO_2$ to the first heated working fluid.

Embodiment 11. The method of any of the above embodiments, wherein the method further comprises: exposing a fourth gas flow comprising 600 vppm or less of $CO_2$ to at least one fourth contactor of a plurality of contactors to form a first $CO_2$-depleted gas flow, the at least one fourth contactor comprising a fourth sorbent having selectivity for $CO_2$ sorption supported on one or more fourth monoliths, the exposing the fourth gas flow further forming a fourth sorbent comprising sorbed $CO_2$; exposing the fourth sorbent comprising sorbed $CO_2$ to a fourth heated working fluid to form a heated fourth sorbent and a fourth $CO_2$-containing working fluid, the fourth $CO_2$-containing working fluid formed by desorbing at least a portion of the sorbed $CO_2$ from the fourth sorbent comprising sorbed $CO_2$; exposing the heated fourth sorbent to a fourth nitrogen-enriched gas comprising 95 vol % of $N_2$ or more to cool the heated fourth sorbent and to heat the fourth nitrogen-enriched gas to form a fourth partially heated working fluid, the fourth nitrogen-enriched gas comprising at least a portion of the first output flow.

Embodiment 12. A system for separation of $CO_2$, comprising: a plurality of initial stage contactors comprising a sorbent having selectivity for sorption of $CO_2$, each initial stage contactor comprising a sorption step inlet, a sorption step outlet, at least one additional inlet, and at least one additional outlet, the plurality of initial stage contactors comprising at least a first initial stage contactor and a final initial stage contactor; a second separation stage comprising a second separation stage inlet, a product outlet, and a recycle outlet; an initial stage effluent conduit providing fluid communication between the second separation stage inlet and the at least one additional outlet of the final initial stage contactor, the initial stage effluent conduit containing an effluent flow comprising 95 vol % or more of $N_2$ and 1.0 vol % or more of $CO_2$; a recycle conduit providing fluid communication between the recycle outlet and the at least one additional inlet of the first initial stage contactor, the recycle conduit containing a recycle gas comprising 95 vol % or more of $N_2$ and 0.08 vol % to 0.5 vol % of $CO_2$; and a working fluid conduit providing fluid communication between the at least one additional outlet of the first initial stage contactor and the at least one additional inlet of a second initial stage contactor, the working fluid conduit further comprising a heater, a heat exchanger, or a combination thereof, the working fluid conduit containing a working fluid comprising 95 vol % or more $N_2$.

Embodiment 13. The system of Embodiment 12, wherein the second initial stage contactor is the final initial stage contactor, and wherein the first initial stage contactor, the working fluid conduit, the final initial stage contactor, the initial stage effluent conduit, the second separation stage, and the recycle conduit comprise a working fluid loop.

Embodiment 14. The system of Embodiment 12, further comprising an intermediate conduit providing fluid communication between the at least one additional outlet of the second initial stage contactor and the at least one additional inlet of the final initial stage contactor, the intermediate conduit containing an intermediate fluid comprising 95 vol % or more of $N_2$ and 1.0 vol % or more of $CO_2$, the intermediate conduit further comprising an intermediate heater, an intermediate heat exchanger, or a combination thereof.

Embodiment 15. The system of Embodiment 14, wherein the first initial stage contactor, the working fluid conduit, the second initial stage contactor, the intermediate conduit, the final initial stage contactor, the initial stage effluent conduit, the second separation stage, and the recycle conduit comprise a working fluid loop.

Additional Embodiment A. The method of any of Embodiments 1 to 11, wherein the at least one first contactor comprises at least one rotary sorbent wheel.

Additional Embodiment B. The system of claim 14 or 15, wherein the initial stage effluent comprises 2.0 vol % or more of $CO_2$.

Certain features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

The foregoing description of the disclosure illustrates and describes the present methodologies. Additionally, the disclosure shows and describes exemplary methods, but it is to be understood that various other combinations, modifications, and environments may be employed and the present methods are capable of changes or modifications within the scope of the concept as expressed herein, commensurate with the above teachings and/or the skill or knowledge of the relevant art.

We claim:

1. A method for separation of $CO_2$ from an input flow stream, comprising:

exposing a first gas flow comprising 600 vppm or less of $CO_2$ to at least one first contactor of a plurality of contactors to form a first $CO_2$-depleted gas flow, the at least one first contactor comprising a first sorbent having selectivity for $CO_2$ sorption supported on one or more first monoliths, the exposing the first gas flow further forming a first sorbent comprising sorbed $CO_2$;

exposing a second gas flow comprising 600 vppm or less of $CO_2$ to at least one second contactor of the plurality of contactors to form a second $CO_2$-depleted gas flow, the at least one second contactor comprising a sorbent having selectivity for $CO_2$ sorption supported on one or more second monoliths, the exposing the second gas flow further forming a second sorbent comprising sorbed $CO_2$;

exposing the first sorbent comprising sorbed $CO_2$ to a first heated working fluid to form a heated first sorbent and a first $CO_2$-containing working fluid comprising 1.0 vol % or more of $CO_2$, the first $CO_2$-containing working fluid formed by desorbing at least a portion of the sorbed $CO_2$ from the first sorbent comprising sorbed $CO_2$;

exposing the heated first sorbent to a first nitrogen-enriched gas comprising 95 vol % of $N_2$ or more to cool the heated first sorbent and to heat the first nitrogen-enriched gas to form a first partially heated working fluid;

heating the first partially heated working fluid to form a second heated working fluid;

exposing the second sorbent comprising sorbed $CO_2$ to at least a portion of the second heated working fluid to form a heated second sorbent and a second $CO_2$-containing working fluid, the second $CO_2$-containing working fluid formed by desorbing at least a portion of the sorbed $CO_2$ from the second sorbent comprising sorbed $CO_2$;

exposing the heated second sorbent to a second nitrogen-enriched gas comprising 95 vol % or more of $N_2$ to cool the heated second sorbent and to heat the second nitrogen-enriched gas to form a second partially heated working fluid;

separating the first $CO_2$-containing working fluid to form at least a first product flow having a $CO_2$ concentration of 80 vol % or more and a first output flow comprising 95 vol % or more of $N_2$; and separating the second $CO_2$-containing working fluid to form at least a second product flow having a $CO_2$ concentration of 80 vol % or more and a second output flow comprising 95 vol % or more of $N_2$.

2. The method of claim 1, wherein the first output flow comprises 0.08 vol % or more of $CO_2$, or wherein the second output flow comprises 0.08 vol % or more of $CO_2$, or a combination thereof.

3. The method of claim 1, wherein the first nitrogen-enriched gas comprises 0.08 vol % or more of $CO_2$, or wherein the second nitrogen-enriched gas comprises 0.08 vol % or more of $CO_2$, or a combination thereof.

4. The method of claim 1, wherein the volumetric flow rate of the first $CO_2$-containing working fluid is 5.0% or less of the volumetric flow rate of the first gas flow, or wherein the volumetric flow rate of the second $CO_2$-containing working fluid is 5.0% or less of the volumetric flow rate of the second gas flow.

5. The method of claim 1, further comprising:

exposing the first sorbent comprising sorbed $CO_2$ to a first pre-heating flow comprising 1.0 vol % or more of $CO_2$ and 95 vol % or more of $N_2$, the exposing the first sorbent comprising sorbed $CO_2$ to a pre-heating flow being performed prior to exposing the first sorbent comprising sorbed $CO_2$ to the heated working fluid.

6. The method of claim 5, further comprising:

heating at least a portion of the first $CO_2$-containing working fluid;

exposing a third gas flow comprising 600 vppm or less of $CO_2$ to at least one third contactor of a plurality of contactors to form a third $CO_2$-depleted gas flow, the at least one third contactor comprising a third sorbent having selectivity for $CO_2$ sorption supported on one or more third monoliths, the exposing the third gas flow further forming a third sorbent comprising sorbed $CO_2$;

exposing the third sorbent comprising sorbed $CO_2$ to a third pre-heating flow comprising the at least a portion of the first $CO_2$-containing working fluid after the heating of the at least a portion of the first $CO_2$-containing working fluid;

exposing the third sorbent comprising sorbed $CO_2$ to a third heated working fluid to form a heated third sorbent and a third $CO_2$-containing working fluid, the third $CO_2$-containing working fluid formed by desorbing at least a portion of the sorbed $CO_2$ from the third sorbent comprising sorbed $CO_2$; and exposing the heated third sorbent to a third nitrogen-enriched gas comprising 95 vol % of $N_2$ or more to cool the heated third sorbent and to heat the third nitrogen-enriched gas to form a third partially heated working fluid.

7. The method of claim 1, wherein the exposing the first sorbent comprising sorbed $CO_2$ to a first heated working fluid comprises exposing the first sorbent comprising sorbed $CO_2$ to the first heated working fluid at a pressure of 150 kPa-a or more.

8. The method of claim 1, wherein the first heated working fluid comprises a temperature of 100° C. to 170° C., or wherein the second heated working fluid comprises a temperature of 100° C. to 170° C., or a combination thereof.

9. The method of claim 1, wherein the first nitrogen-enriched gas comprises a temperature of 20° C. to 80° C., or wherein the second nitrogen-enriched gas comprises a temperature of 20° C. to 80° C., or a combination thereof.

10. The method of claim 1, wherein separating the first $CO_2$-containing working fluid comprises separating the first $CO_2$-containing working fluid using an amine scrubber; or wherein separating the first $CO_2$-containing working fluid comprises performing a temperature swing separation; or wherein separating the first $CO_2$-containing working fluid comprises performing a temperature swing vacuum-assisted separation using a sorbent supported on a solid support; or a combination thereof.

11. The method of claim 1, wherein the first sorbent comprises an amine-based sorbent, or wherein the second sorbent comprises an amine-based sorbent, or a combination thereof.

12. The method of claim 1, further comprising exposing the first sorbent comprising sorbed $CO_2$ to a purge flow prior to exposing the first sorbent comprising sorbed $CO_2$ to the first heated working fluid.

13. The method of claim 1, wherein the at least one first contactor comprises at least one rotary sorbent wheel.

14. The method of claim 1, wherein exposing the heated first sorbent to a first nitrogen-enriched gas comprising 95 vol % of $N_2$ further comprises exposing the heated first sorbent to a recycled portion of the first partially heated working fluid.

15. The method of claim 1, wherein the recycled portion of the first partially heated working fluid is cooled prior to exposing the recycled portion of the first partially heated working fluid to the heated first sorbent.

16. The method of claim 1, wherein the method further comprises:

exposing a fourth gas flow comprising 600 vppm or less of $CO_2$ to at least one fourth contactor of a plurality of contactors to form a fourth $CO_2$-depleted gas flow, the at least one fourth contactor comprising a fourth sorbent having selectivity for $CO_2$ sorption supported on one or more fourth monoliths, the exposing the fourth gas flow further forming a fourth sorbent comprising sorbed $CO_2$;

exposing the fourth sorbent comprising sorbed $CO_2$ to a fourth heated working fluid to form a heated fourth sorbent and a fourth $CO_2$-containing working fluid, the fourth $CO_2$-containing working fluid formed by desorbing at least a portion of the sorbed $CO_2$ from the fourth sorbent comprising sorbed $CO_2$;

exposing the heated fourth sorbent to a fourth nitrogen-enriched gas comprising 95 vol % of $N_2$ or more to cool the heated fourth sorbent and to heat the fourth nitrogen-enriched gas to form a fourth partially heated working fluid, the fourth nitrogen-enriched gas comprising at least a portion of the first output flow.

* * * * *